(12) United States Patent  
Wai et al.

(10) Patent No.: US 7,375,985 B2
(45) Date of Patent: May 20, 2008

(54) HIGH EFFICIENCY SINGLE STAGE BIDIRECTIONAL CONVERTER

(75) Inventors: Rong-Jong Wai, Liouying Township, Tainan County (TW); Li-Wei Liu, Jung-He (TW)

(73) Assignee: Yuan Ze University, Taoyuan (TW)

( * ) Notice: Subject to any disclaimer, the term of this patent is extended or adjusted under 35 U.S.C. 154(b) by 257 days.

(21) Appl. No.: 11/377,417

(22) Filed: Mar. 17, 2006

(65) Prior Publication Data

US 2007/0216319 A1 Sep. 20, 2007

(51) Int. Cl.
H02M 3/335 (2006.01)

(52) U.S. Cl. .......................... 363/17; 363/98; 320/108; 320/138

(58) Field of Classification Search ................ 363/17, 363/37, 97, 98, 21.04, 132, 89; 320/104, 320/108, 109, 138
See application file for complete search history.

(56) References Cited

U.S. PATENT DOCUMENTS

| | | | |
|---|---|---|---|
| 5,751,133 A * | 5/1998 | Sato et al. | 320/101 |
| 6,088,250 A * | 7/2000 | Siri | 363/97 |
| 6,548,985 B1 * | 4/2003 | Hayes et al. | 320/108 |
| 6,984,965 B2 * | 1/2006 | Vinciarelli | 323/266 |
| 7,193,872 B2 * | 3/2007 | Siri | 363/95 |

* cited by examiner

Primary Examiner—Rajnikant B. Patel

(57) ABSTRACT

The present invention focuses on the development of a high-efficiency single-stage bidirectional converter with multi-input power sources. In the present invention, it takes a three-winding coupled inductor as the main component of energy transmission, and utilizes only two power semiconductor switches to accomplish the multi-input function. According to the designed switching conditions, this circuit could be operated at discharge, charge and standalone states to simplify conventional structure in which multiple converters are used in boosting voltage and then connected in parallel to supply power. Moreover, the coupled inductor as the principal part of this circuit has high-voltage gain property, and the present invention fully utilizes the winding voltage in the high-voltage side to further increase the corresponding voltage gain superior to that in the conventional coupled-inductor strategy. This property is helpful to solve the power conversion problem caused by clean energies with inherent low-voltage characteristics. In addition, all switches and diodes have favorable voltage-clamped effects so that the voltage spikes induced by the leakage-induction energy can be alleviated effectively, and there are no high reverse-recovery currents within diodes because the leakage induction can restrain instantaneous changes in the current. Furthermore, the present invention has a charging route of low-voltage conversion without adding additional components, avoiding the power losses induced by the multistage conversion in the traditional auxiliary power systems, and utilizes the synchronous rectification technique to decrease the conducting losses.

6 Claims, 24 Drawing Sheets

(a)

(b)

Mold1 (a)

Mold2 (b)

Mold3 (c)

Mold4 (d)

Mold5 (e)

Mold6 (f)

Mold1 (a)

Mold2 (b)

Mold3 (c)

Mold4 (d)

Mold5 (e)

Mold6 (f)

Mold7 (g)

Mold8 (h)

Mold1 (a)

Mold2 (b)

Mold3    (c)

Mold4    (d)

Mold5 (e)

Mold6 (f)

(c)

(d)

(a)

(b)

(c)

(d)

(a)

(b)

(c)

(d)

HIGH EFFICIENCY SINGLE STAGE BIDIRECTIONAL CONVERTER

BACKGROUND OF THE INVENTION

1. Field of the Invention

The present invention is related to DC-DC conversion technology, specifically, using clean energy in a distributed electrical generating system, and utilizing rechargeable batteries as auxiliary power source, in which multiple inputs mechanism, charging loop of low voltage conversion, voltage clamping and synchronous rectification technique are used to overcome the drawback in existing clean energy used in the distributed electrical generating system.

2. Description of the Prior Art

Clean energy source becomes an important subject due to oil shortage crisis. Clean energy source, such as fuel cell battery, solar battery, can be used in a distributed power generation equipment, including electrical transportation equipment, un-interrupted electrical power system and standalone electrical power generating system, etc. In a distributed power generating system in which clean energy source is used, normally rechargeable battery is used as auxiliary power source, effectively reducing load capacity of the clean energy source and cost for the system and generating power. In a conventional system, multiple converters are connected in parallel to high voltage DC bus bar [1]-[2], as front power source for an inverter or directly apply to circuit equipment. However, one of the converters has to be able to function in bi-direction for charging the rechargeable battery; the energy needed for charging is from clean energy source and this energy has to be converted many time before reaching the rechargeable battery, therefore reducing efficiency substantially. Overall, conventional system is large in size, complex in structure and expensive [2]. To simplify circuit structure, improve performance and reduce cost, single-stage, multiple-input and bidirectional high-efficiency converter becomes the focus of latest research and development around the world. [3]-[7].

References [8]-[9] all proposed multiple windings transformer type to achieve multiple-input. The topology proposed by reference [8] is very simple; it utilizes time-sharing method to control multiple power sources of the transformer, which can induce voltage clamping problem. This control method also makes driving circuit more complex; and under impact of duty cycles being divided, each power source has fewer duty cycles, decreasing voltage gain of the converter. In addition, adding diode in main passage of power supply will increase conduction loss for a clean energy source with of low voltage/large current character, and decrease conversion efficiency; also, it will prevent possibility of charging route and is not well suit for clean energy source applied in distributed power generating system. The reference [9] uses concept of current source and overcomes voltage clamping problem associated with multiple power sources supplying power, and also uses complete duty cycle to adjust output voltage. However, the main route also has several diodes and excessive number of switches, making charging route impossible; this will mandate additional charging circuit and make the structure more complex and less efficient.

Due to its electrical characteristics of low voltage and large current as well as high output voltage, clean energy source is large in size and difficult to make; its output voltage fluctuates easily with load variation. Also, high voltage rechargeable battery made up of multiple stacked batteries is not reliable, making it more appealing to have multiple-input converter with high voltage boost gain for applications which require high voltage. In conventional technique [8]-[9], separation transformer is used as voltage boost device. However, maximum voltage boost gain of this kind of structure only equals to winding ratio, and output rectifying diode has to bear at least twice of output voltage; to high output voltage, it is hard to find qualified diode. The references [10]-[11] all proposed non-separation coupled inductor structure as voltage boost method. The coupled inductor structure can not only provide higher voltage boost ratio, but also reduces voltage burden on switches and reversal-recovery current of the diode. For voltage boost using coupled inductor, the key technique leis in processing of leakage induction energy; if not processed properly, it will cause high voltage spikes, increasing conducting loss and necessitate higher voltage bearing on the switches. The reference [11] offers a passage for leakage induction energy on low voltage side, and effectively clamping the voltage on the switches, making possible to use low loss components. However, a snubber circuit has to be added to output diode to suppress high voltage spike induced by leakage induction of the winding on high voltage side. In addition, the references [10]-[11] do not have multi-input function. In summary, an electrical power conversion equipment with high performance, clean energy source, distributed power generating system should have multi-input function, charging loop route, high voltage boost ration and high conversion efficiency.

The present invention can operate in discharging state, standalone state and charging state by utilizing the characteristic of clean energy source in which the voltage changes easily with load while rechargeable battery has stable voltage output. Both voltage power sources are directly connected to the inputs of a three winding coupled inductor as voltage source. When both rechargeable battery and clean energy source supply power, voltage on the winding of clean energy source is adjusted according to voltage on the winding of rechargeable battery, and balancing with the voltage on the winding of rechargeable battery; therefore, no complex control and no additional circuit design are required, and it overcomes voltage inconsistence at input from the voltage source. The charging loop route makes energy transfer through the coupled inductor, which is a low voltage conversion type, and it has higher energy utilization rate than that of conventional auxiliary power system. In addition, the coupled inductor used as main circuit body has high voltage boost gain; the present invention further utilizes the voltage on the winding of high voltage side and has higher voltage gain than conventional coupled inductor structure, and is useful in solving power conversion problem existed in clean energy source with low voltage source. Both the switches and diodes of the present invention are used in clamping voltage, effectively handling voltage spike phenomenon induced by leakage induction energy; it also utilize the characteristic of leakage induction limiting instantaneous current change to prevent high reversal recovery current in the diodes. In summary, the circuit topology of the present invention can achieve high efficiency single-stage multi-input bi-directional power conversion and is suitable in high performance clean energy distributed power generating system.

REFERENCE

[1] K. Agbossou, M. Kolhe, J. Hamelin, and T. K. Bose, "Performance of a stand-alone renewable energy system based on energy storage as hydrogen," IEEE Trans. Energy Conversion, vol. 19, no. 3, pp. 633-640, 2004.

[2] L. Solero, A. Lidozzi, and J. A. Pomilio, "Design of multiple-input power converter for hybrid vehicles," IEEE Applied Power Electronics Conference and Exposition, 2004, pp. 1145-1151.

[3] B. G. Dobbs and P. L. Chapman, "A multiple-input DC-DC converter topology," IEEE Power Electron. Letter, vol. 1, no. 1, pp. 6-9, 2003.

[4] F. Z. Peng, H. Li, G. J. Su, and J. S. Lawler, "A new ZVS bidirectional DC-DC converter for fuel cell and battery application," IEEE Trans. Power Electron., vol. 19, no. 1, pp. 54-65, 2004.

[5] Z. Jiang and R. A. Dougal, "Synergetic control of power converters for pulse current charging of advanced batteries from a fuel cell power source," IEEE Trans. Power Electron., vol. 19, no. 4, pp. 1140-1150, 2004.

[6] Z. Jiang, L. Gao, and R. A. Dougal, "Flexible multi-objective control of power converter in active hybrid fuel cell/battery power sources," IEEE Trans. Power Electron., vol. 20, no. 1, pp. 244-253, 2005.

[7] L. Gao, Z. Jiang, and R. A. Dougal, "Evaluation of active hybrid fuel cell/battery power sources," IEEE Trans. Aero. Electron. Syst., vol. 41, no. 1, pp. 346-355, 2005.

[8] H. Matsuo, W. Z. Lin, F. Kurokawa, T. Shigemizu, and N. Watanabe, "Characteristics of the multiple-input DC-DC converter," IEEE Trans. Ind. Electron., vol. 51, pp. 625-631, 2004.

[9] Y. M. Chen, Y. C. Liu, and F. Y. Wu, "Multi-input DC/DC converter based on the multiwinding transformer for renewable energy applications," IEEE Trans. Ind. Appl., vol. 38, pp. 1096-1104, 2002.

[10] K. Hirachi, M. Yamanaka, K. Kajiyama, and S. Isokane, "Circuit configuration of bidirectional DC/DC converter specific for small scale load leveling system," IEE Power Conversion Conf., 2002, pp. 603-609.

[11] Q. Zhao and F. C. Lee, "High-efficiency, high step-up DC-DC converters," IEEE Trans. Power Electron., vol. 18, no. 1, pp. 65-73, 2003.

SUMMARY OF THE INVENTION

The present invention is a high efficiency single-stage multi-input bidirectional converter, as shown in FIG. 1, and comprises a first DC input circuit 101, including a first DC input voltage source V1; a second DC input circuit 102, including a second DC input voltage source V2 which is rechargeable battery; a first winding circuit 103, including a first winding L1 of a coupled inductor and a first power semiconductor switch S1; the first winding L1 of the coupled inductor and the first power semiconductor switch S1 are connected in series, and on/off of the switch S1 controls storing and releasing of energy in the first winding L1; a second winding circuit 104, including a second winding L2 of the coupled inductor and a second power semiconductor switch S2; the second winding L2 of the coupled inductor and the second power semiconductor switch S2 are connected in series; a third winding circuit 105, including a third winding L3 of the coupled inductor, a balance capacitor Cb a first high voltage diode D1, a second high voltage diode D2, a first high voltage capacitor Co1 and a second high voltage Co2; one end of the third winding L3 connects to the input of the first high voltage diode D1, the output of the first high voltage diode D1 connects to the positive end of the first high voltage capacitor Co1, the negative end of the first high voltage capacitor Co1 connects to the positive end of the second high voltage capacitor Co2, the negative end of the second high voltage capacitor Co2 connects to the input of the second high voltage diode D2, the output of the second high voltage diode D2 then connects back to the input of the first high voltage diode D1; at the same time, the other end of the third winding L3 of coupled inductor connects to one end of the balance capacitor Cb, the other end of the balance capacitor Cb, connects to the negative end of the first high voltage capacitor Co1; a clamping circuit 106, including a clamping capacitor Co3, a first clamping diode Dc1 and a second clamping diode Dc2;

both outputs of the first clamping diode Dc1 and the second clamping diode Dc2 are connected to the positive end of the clamping capacitor Co3; a DC output circuit 107, including a load Ro, i.e., DC high voltage bus bar; a charge/discharge control and drive circuit 108, including feedback voltage of the first DC input voltage source V1, the second DC input voltage source V2 and DC output voltage Vo; through charge/discharge control and drive circuit 108, driving signals for adjusting duty cycle are generated, which turns on and off the first and second power semiconductor S1 and S2; there exist three states depending on switching conditions of the first and second power semiconductor switches S1 and S2, assuming the first DC input voltage source V1 is first preferred supplier; the first state is discharging state, in which the first and second power semiconductor S1 and S2 turn on/off at the same time; the second state is charging state, in which the first and second power semiconductor S1 and S2 turn on/off at the same time; the third state is standalone state, where only the first power semiconductor S1 turns on/off.

The charging state uses the first and second DC input power sources V1 and V2, through a high efficiency single-stage multi-input bi-directional converter, to boost the voltages of the DC inputs V1 and V2 and supply the high voltage power to the load Ro; when both the first power semiconductor switches S1 of the first winding circuit 103 and the second power semiconductor switches S2 of the second winding circuit 104 are turned on, the excited induction Lm1 and Lm2 of the first and second winding of coupled inductor build up voltage and store energy; at the time, the polar terminal of the third winding L3 of coupled inductor has positive voltage, and the first high voltage diode D1 of the third winding circuit 105 is turned on, charging the first high voltage capacitor Co1, while the current iL3 of the third winding L3 of coupled inductor is supplied by the induction of the first and second winding L1 and L2; when both the first power semiconductor switches S1 and the second power semiconductor switches S2 are turned off, the first clamping diode Dc1 and the second clamping diode Dc2 are turned on and charge the clamping capacitor Co3, absorbing released energy by the first and second winding leakage induction Lk1 and Lk2 of coupled inductor and reducing voltage spikes occurrence cross the switches; at the same time, according to flux conservation theory, the energy stored in the first and second winding excited induction Lm1 and Lm2 are converted to energy for the third winding L3 to charge the second high voltage capacitor Co2 of the circuit 105; by adding the voltages of the first high voltage capacitor Co1, the second high voltage capacitor Co2 and the clamping capacitor Co3, a stable DC output voltage Vo is obtained.

Other than using the first DC input voltage source V1, through a high efficiency single-stage multi-input bi-directional converter, to greatly boost the voltage of the DC input source V1 and supply the power to the load Ro, the present invention also can use the first DC input source V1 to directly charge the second DC input source V2; when the first power semiconductor switch S1 of first winding circuit 103 is turned on, the first winding induction Lm1 establishes voltage in each winding and stores energy; at the same time, the polar terminal of the second winding L2 has a positive voltage, and the second power semiconductor switch S2 of second winding circuit 104 is turned on and charges the second DC input voltage source V2, where the second power semiconductor switch S2 has a synchronous rectification effect. Moreover, the polar terminal of the third winding L3 has a positive voltage, and through the first high voltage diode D1 of third winding circuit 105, charges the first high voltage capacitor Co1; at the moment, the current iL2 and iL3 of the second and third winding are provided by the current iL1 of the first winding; when the first power semiconductor switch S1 is turned off, and the first clamping diode Dc1 of clamping circuit 106 is turned on and charges the clamping capacitor Co3, absorbing energy released by the first winding leakage induction Lk1 and preventing circuit components damaged by voltage spike; in addition, after the third winding current iL3 reverses direction, according to flux conservation theory, the energy stored in the first winding induction Lm1 converts to induction energy in the third winding L3 for charging the second high voltage capacitor Co2 of third winding circuit 105; by adding the voltages of the first high voltage capacitor Co1, the second high voltage capacitor Co2 and the clamping capacitor Co3, a stable DC output voltage Vo is obtained.

In the standalone state, the present invention uses the first DC input voltage source V1 and on/off of the first power semiconductor switch S1 of first winding circuit 103, through a high efficiency single-stage multi-input bi-directional converter, to substantially boost the voltage of the DC input source V1 and supply the power to the load Ro; when the first power semiconductor switch S1 of first winding circuit 103 is turned on, the first winding excited induction Lm1 establishes voltages of each winding and stores energy; the polar terminal of third winding L3 has positive voltage, causing the first high voltage diode D1 of third winding circuit 105 to turn on and further charging the first high voltage capacitor Co1, where the third winding current iL3 is also provided by the first winding current iL1; when the first power semiconductor switch S1 is turned off, the first clamping diode Dc1 of the clamping circuit 106 is turned on and charges the clamping capacitor Co3, absorbing energy released by the first winding leakage induction Lk1 of coupled inductor; at the same time, according to flux conservation theory, energy stored in the first winding excited induction Lm1 is converted to energy of the third winding L3 for charging the second high voltage capacitor Co2; by adding the voltages of the first high voltage capacitor Co1, the second high voltage capacitor Co2 and the clamping capacitor Co3, a stable DC output voltage Vo is obtained.

To simplify the explanation process, the circuit symbols (e.g., circuit 101) are omitted, and directly referring to the related figures. The first DC input voltage source can be a power source with relative large inner resistance, in which voltage change easily with load, such as, fuel cell battery, solar battery, etc. Depending on whether or not the first DC input voltage source V1 supplies power, the rechargeable battery charges or discharges accordingly. The relationship between the voltage and power of the first input DC power source V1 is described as follows:

$$P_{1max}|_{V_{1min}} > P_{1d}|_{V_{1d}} > P_{1a}|_{V_{1a}} > P_{1c}|_{V_{1C}} > P_{1min}|_{V_{1max}} \quad (1)$$

$$V_{1max} > V_{1c} > V_{1a} > V_{1d} > V_{1min} \quad (2)$$

where V1max is open circuit voltage, and output power is zero, i.e., P1min=0; P1max is the overload power of first input DC voltage source V1, and can operate in short period of time and is about 1.5 times of specified power; at the moment, the output current is maximum and since large inner resistance, its output voltage is minimum voltage V1min; it's worth noting that long term operating under P1max can damage power equipment; therefore, normal operating power should be specified power P1d, and assuming corresponding voltage is V1d, and when the power needed by load Ro is larger than the power provided by the first DC input voltage source V1, the second DC input voltage source V1 (rechargeable battery) should discharge to the load to make up the shortage; when the load Ro needs less power, i.e., light load, left over power from the first DC input voltage source V1 can be used to charge the rechargeable battery; at the moment, the power provide by the first DC input voltage source V1 is P1c, and corresponding voltage V1c, it is charging state; the power needed by the load Ro is between the power P1d and P1c supplied by the first DC input voltage source V1, i.e., P1a; assuming its corresponding voltage is V1a, then the first DC input voltage source V1 supplies power to the load alone, and this is standalone state.

FIG. 2 shows an equivalent circuit of a high efficiency single-stage multi-input converter of the present invention, where FIG. 2(a) is the equivalent circuit for discharging state while FIG. 2(b) is the equivalent circuit for standalone and charging state; the difference between the two equivalent circuits lies in whether the second winding L2 of coupled inductor has equivalent excited induction Lm2. The voltage and current directions of circuit components are defined as in FIG. 2, and to simplify analysis, the voltage drop in power semiconductor switches and diodes are omitted when they are turned on. In the equivalent circuit of FIG. 2, the number of first winding L1, second winding L2 and third winding L3 of coupled inductor Tr are N1, N2 and N3, and their winding ratios are:

$$n_{13} = N_3/N_1 \quad (3)$$

$$n_{23} = N_3/N_2 \quad (4)$$

$$n_{12} = N_2/N_1 \quad (5)$$

In FIG. 2 of equivalent circuit of discharging state, the first and second winding L1 and L2 of coupled inductor Tr each has excited induction Lm1, Lm2 and leakage induction Lk1, Lk2, and the two winding coupling coefficients are defined as:

$$k_1 = L_{m1}/(L_{k1}+L_{m1}) \quad (6)$$

$$k_2 = L_{m2}/(L_{k2}+L_{m2}) \quad (7)$$

Since the coupled inductor Tr is made in sandwich winding fashion, winding coupling is high; therefore k1 and k2 are close to 1; on other hand, since the present invention designates the first DC input voltage source V1 as first preferred supplier, Lk1>Lk2 and V1>V2 are assumed during circuit mode analysis. The present invention has three circuit sequential and working modes, and FIGS. 3 and 4 show discharging state, FIGS. 5 and 6 show charging state, FIGS. 7 and 8 show standalone state. Referring to FIG. 3-8, following is detailed explanation of working theory for the present invention.

Discharging State

When the power needed by the load Ro is over P1d, V1min<V1<V1d, and S1 and S2 are turned on/off at the same; at the moment, the circuit is in discharging state, and its circuit operation is as follows:

Mode 1: time [t0–t1], FIG. 4(a)

The first and second power semiconductor S1 and S2 are turned on for a small period of time; in this time, excited induction Lm1 establishes a voltage:

$$v_{Lm1}|_{t_0-t_1} = k_1 V_1 \tag{8}$$

The excited induction voltage vLm1 of the first winding couples to the second winding L2 and the third winding L3, and their voltages are:

$$v_{Lm2}|_{t_0-t_1} = n_{12} k_1 V_1 \tag{9}$$

$$v_{N3}|_{t_0-t_1} = n_{13} k_1 V_1 \tag{10}$$

According to equation (9), the second DC input voltage source V2 has to be higher than vLm2=n12k1V1 in order to provide power, and when V2>n12k1V1, two excited induction Lm1 and Lm2 excite magnetic flux at the same time, and because coupling degree of the two winding L1 and L2 are different, the one with lower coupling coefficient is responsible for most part of induction current; on other hand, the one with higher coupling coefficient is responsible for most part of the current iL3 induced by the third winding L3 of coupled inductor; therefore, the excited induction Lm1 of the first winding L1 produces most part of stored energy of excited current, while the second winding L2 provides most part of induction current iL3 needed by the third winding L3. From equation (10), the polar terminal of the third winding L3 of coupled inductor has positive voltage, causing the first high voltage diode D1 being turned on, to further charging the first high voltage capacitor Co1, and its voltage is $$v_{Co1} = n_{13} k_1 V_1 + v_{Cb} \tag{11}$$

Where VCb is the voltage on the balance capacitor Cb of third winding circuit 105.

Mode 2: time [t1–t2], FIG. 4(b)

At time t=t1, the first power semiconductor switch S1 and the second power semiconductor switch S2 are turned off; at the moment, the current iL1 and iL2 of the first winding and second winding of coupled inductor charge the parasite capacitors of the first power semiconductor switch S1 and the second power semiconductor switch S2. When the voltage vs1 and vs2 cross the switches are higher than the voltage vCo3 of clamping capacitor Co3, the first clamping diode Dc1 and the second clamping diode Dc2 are turned on, charging the clamping capacitor Co3 and absorbing energy released by the leakage induction Lk1 of the first winding and the leakage induction Lk2 of the second winding, which prevents voltage spike occurring cross switches. Due to continued leakage induction current of the third winding, the current iL3 of the third winding of coupled inductor keeps charging the first high voltage capacitor Co1 through the first high voltage diode D1, absorbing energy released by leakage induction of third winding L3 until iL3=0.

Mode 3: time [t2–t3], FIG. 4(c)

When t=t2, the current iL3 of third winding of coupled inductor is reduced to zero, excited induction current iLm1 and iLm2 of first and second winding of coupled inductor release energy and couple to the current iL3 of third winding, which gradually rises and flow out of the non-polar terminal. The current iL3 of third winding provides reversal recovery current needed to cut off the first high voltage diode D1, to establish cut off voltage vD1; at the same time, due to the cut off voltage vD1 of first high voltage diode D1 gradual rise, the cut off voltage vD2 of second high voltage diode D2 falls to zero. The sum current of two diodes D1 and D2 equals to the current iL3 of third winding, and leakage induction of third winding L3 will limit current change rate; therefore reversal recovery current and forwarding conducting current of the diodes are small. Furthermore, due to continued currents iL2 of leakage induction Lk2 of the second winding, when the second clamping diode Dc2 is turned on and charges clamping capacitor Co3, the voltage cross second power semiconductor switch S2 will be a little higher than clamping voltage vS2 of which the second power semiconductor switch should have; therefore the discharging slop rate of second winding current iL2 of coupled current is bigger than the discharging slop rate of first winding current iL1, making the second winding current iL2 of coupled current discharges to zero earlier than that of first winding current iL1; when the second winding current iL2 of coupled current discharges to zero, the voltage vS2 cross second power semiconductor switch S2 returns to designed clamping voltage.

Mode 4: time [t3–t4], FIG. 4(d)

When t=t3, cut off voltage vD2 of second high voltage diode D2 releases to zero and is turned on, at the same time first high voltage diode D1 is turned off. According to flux conservation theory, the energy needed in charging second high voltage capacitor Co2 by the third winding L3 of coupled inductor comes from the energy stored by the first winding excited induction Lm1 and the second winding excited induction Lm2 during mode 1. According to the volt-second balance theory, voltages of each winding of coupled inductor can be expressed as $$v_{Lm1}|_{t_3-t_4} = -\frac{D k_1 V_1}{1-D} \tag{12}$$

$$v_{Lm2}|_{t_3-t_4} = -\frac{n_{12} D k_1 V_1}{1-D} = -\frac{D k_2 V_2}{1-D} \tag{13}$$

$$v_{N3}|_{t_3-t_4} = -\frac{n_{13} D k_1 V_1}{1-D} = -\frac{n_{23} D k_2 V_2}{1-D} \tag{14}$$

where D is switch's duty cycle. Hence, the voltage vCo3 of clamping capacitor Co3 can be expressed as $$v_{Co3} = V_1 - v_{Lm1}|_{t_3-t_4} - v_{Lk1}|_{t_3-t_4} \tag{15}$$

since coupling coefficients k1 and k2 are close to 1, energy of the leakage induction Lk1 and Lk2 of coupled inductor Tr is relatively small comparing to iron core's capacity, and leakage induction energy can be effectively absorbed by the clamping capacitor Co3, and no voltage spike phenomenon happens; therefore voltage induced by the leakage inductions can be omitted, and accordingly, equation (15) can be rewritten as $$v_{Co3} = V_1 - v_{Lm1}|_{t_3-t_4} = \frac{1-D(1-k_1)}{1-D} V_1 = v_{S1}|_{t_3-t_4} \tag{16}$$

also, cut off voltage vS1 of the first power semiconductor switch S1 equals to equation (16), and cut off voltage vS2 of the first power semiconductor switch S2 is $$v_{S2}|_{t_3-t_4} = V_2 - v_{Lm2}|_{t_3-t_4} = \frac{1-D(1-k_2)}{1-D} V_2 \tag{17}$$

on other hand, from equation (14) the voltage vCo2 of the second high voltage capacitor Co2 is $$v_{Co2} = -v_{N3}\Big|_{t_3 \sim t_4} - v_{Cb} = \frac{n_{13}Dk_1V_1}{1-D} - v_{Cb} \qquad (18)$$

since when switch's duty cycle D≠0.5, the voltage vN3 of the third winding of coupled inductor forms different positive and negative voltages; specially when the duty cycle is very far from 0.5, the voltage vCo1 of first high voltage capacitor and the voltage vCo2 of second high voltage capacitor are very different, causing difficulty in choosing components; utilizing the balance capacitor Cb of third winding circuit 105 can make the two voltages vCo1 and vCo2 of the high voltage capacitors equal; from equation (11) and (18), the voltage vCb of balance capacitor can be obtained $$v_{Cb} = \frac{n_{13}k_1(2D-1)}{2(1-D)}V_1 \qquad (19)$$

further the voltage vCo1 of first high voltage capacitor and the voltage vCo2 of second high voltage capacitor can be attained $$v_{Co1} = v_{Co2} = \frac{n_{13}k_1}{2(1-D)}V_1 \qquad (20)$$

from this, it can be known that under condition of the positions of polar terminals of first and second winding L1 and L2 do not change, when the polar terminal of L3 switches to other end, the circuit can still operation as normal and charges the first high voltage capacitor Co1 and second high voltage capacitor Co2; the only difference is in the order of charging. In addition, from equation (16) and (20), output voltage Vo will be $$V_o = v_{Co1} + v_{Co2} + v_{Co3} = \frac{1 + n_{13}k_1 - D(1-k_1)}{1-D}V_1 \qquad (21)$$

hence, voltage gain when the converter is in discharging state can be expressed as $$G_{V1} = \frac{V_o}{V_1} = \frac{1 + n_{13}k_1 - D(1-k_1)}{1-D} \qquad (22)$$

from equation (22), we know that the converter does not require very large duty cycle D in order to provide high voltage boost gain. On the other hand, by observing equation (16), (17) and (21), it is clear that cut off voltages vS1 and vS2 of first and second power semiconductor switch S1 and S2 is lower than output voltage Vo, which will be beneficial in choosing switches with low voltage bearing when having high voltage output.

Mode 5: time [t4–t5], FIG. 4(e)

At t=t4, the first power semiconductors S1 and second power semiconductors S2 are turned on, excited induction Lm1 of first winding of coupled inductor and excited induction Lm2 of second winding of coupled inductor once again are excited and stores energy. The current iL3 of third winding of coupled inductor is kept on through second high voltage diode D2 to release the leakage induction of third winding L3 and its energy is absorbed by second high voltage capacitor Co2. The first high voltage diode D1 is still in reversal bias state, and its cut off voltage vD1 equals to the cut off voltage vD2 of second high voltage diode D2 at the time t=t0–t2, shown in equation (23); from equation (21), we know that cut off voltages vD1 and vD2 of first and second high voltage diodes D1 and D2 are lower than output voltage Vo.

$$v_{D1}\Big|_{t_3 \sim t_5} = v_{D2}\Big|_{t_0 \sim t_2} = v_{Co1} + v_{Co2} = \frac{n_{13}k_1}{(1-D)}V_1 < V_o \qquad (23)$$

Mode 6: time [t5–t0], FIG. 4(f)

The leakage induction energy of third winding of coupled inductor releases to zero at t=t5; therefore the current iL3 of third winding of coupled inductor reverses direction, and making the first high voltage diode D1 to discharge; at the same time, the second high voltage diode D2 is charged to establish cut off voltage vD2; then, at the moment t=t0 when the first high voltage diode D1 is turned on, switching cycle is finished and returning to mode 1.

Charging State

When the power needed by load Ro is relative small, the first DC input voltage source V1 has extra power which can be used to charge the rechargeable battery; where V1 max>V1>V1c, and S1 and S2 are turned on and off at the same time; the circuit operating states and modes are described as follows:

Mode 1: time [t0–t1], FIG. 6(a)

The first power semiconductor switch S1 and second power semiconductor switch S2 have already been turned on for a while, and excited induction Lm1 of first winding of coupled inductor stored energy which is coupled to the second winding L2 and third winding L3 to establish voltages; the corresponding voltages are vN2 and vN3, as expressed in equations (9) and (10). When the second DC input voltage source V2 is lower than vN2=n12k1V1, the current iL2 of second winding of coupled inductor will flow out of the polar terminal, charging the second DC input voltage source V2; at this moment, the second power semiconductor switch S2 has an effect of synchronous rectification. In addition, the polar terminal of third winding L3 of couple inductor has positive voltage, through first high voltage diode D1, charges first high voltage capacitor Co1. At the time, induction current iL2 and iL3 are both provided by first winding L1 of coupled inductor.

Mode 2: time [t1–t2], FIG. 6(b)

The first power semiconductor switch S1 and second power semiconductor switch S2 are turned off at the time t=t1; at this time, current iL1 of first winding of couple inductor, first, charges parasite capacitor of first power semiconductor switch S1. When voltage vS1 cross the switch is higher than voltage vCo3 of clamping capacitor Co3, the first clamping diode Dc1 is turned on, absorbing energy released by leakage induction Lk1 of first winding of coupled inductor. The current iL2 of second winding of coupled inductor has to rely on body diode of second power semiconductor switch S2, to continue flow in order to release energy stored by leakage induction Lk2 of second winding L2, which will be absorbed by second DC input voltage source V2. Furthermore, since the leakage induction voltage vLk1 established by leakage induction Lk1 of first winding of coupled inductor during mode 2 prevents voltage vLm1 of excited induction Lm1 of first winding of coupled inductor from reverse the polar point instantly, the polar point still have positive voltage; therefore, excited induction Lm1 of first winding of coupled inductor will continue while the current slop is smaller than the slop of excited induction current Lm1|tn~t1. In addition, current iL3 of third winding of coupled inductor continues charge the first high voltage capacitor Co1, letting third winding L3 of coupled inductor to release its stored energy.

Mode 3: time [t2–t3], FIG. 6(c)

The current iL2 of second winding of coupled inductor becomes zero at t=t2, and direction of current iL2 starts reversing, charging parasite capacitor of second power semiconductor switch S2 and establishing cut off voltage vS2. At the same time, after leakage induction energy of third winding vS2 of coupled inductor releases to zero, excited induction current iLm1 of first winding provides reversal current to third winding L3 of coupled inductor and this current gives reversal recovery current needed for first high voltage diode D1 to cut off in order to establish cut off voltage vD1; at the same time, cut off voltage vD2 of second high voltage diode D2 will drop due to gradual increase of cut off voltage vD1 of first high voltage diode D1.

Mode 4: time [t3–t4], FIG. 6(d)

At t=t3, second high voltage diode D2 is turned on due to cut off voltage vD2 releases to zero, and first high voltage diode D1 cuts off too. Energy stored by excited induction Lm1 of first winding of coupled inductor, through second high voltage diode D2, charges to second high voltage capacitor Co2. Similar to the deduction process for equation (10), (11), (14), (18), (19) and (20), we know that first and second high voltage capacitor Co1 and Co2 are $$v_{Co1} = v_{Co2} = \frac{n_{13}k_1(D+D_t)}{2D_t}V_1 \quad (24)$$

where Dt is the duty cycle of current mode time t=t4–t3 relative to the whole switching cycle. From this, we know that under the condition of no change in polar points for first and second winding L1 and L2 of coupled inductor, when the polar point of third winding L3 of coupled inductor changes to the other end, the circuit still operates as normal; it will charge first and second high voltage capacitor Co1 and Co2 of third winding circuit, only with different charging order. In addition, from equation (8), (12), (15) and (16), we know that clamping capacitor vCo3 is $$v_{Co3} = \frac{D_t + Dk_1}{D_t}V_1 \quad (25)$$

the maximum value of current iD2 of second high voltage diode multiplies n13 equals approximately to the maximum value of excited induction current iLm1 of mode 1. Omitting leakage voltage vLk1 of first winding L1 of coupled inductor, average current D2 of second high voltage diode D2 can be shown as $$I_{D2} = \frac{1}{2}\frac{V_1 DT}{n_{13}L_{m1}}D_t \quad (26)$$

since average current ID2 of second high voltage diode D2 equals to load current Io, Dt is $$D_t = \frac{2n_{13}L_{m1}V_o}{DTRV_1} \quad (27)$$

from equation (24), (25) and (27), we know that when the converter operates with non-continuous current in charging state, voltage gain is $$G_{V2} = \frac{1}{2}\left[(1+n_{13}k_1) + \sqrt{(1+n_{13}k_1)^2 + \frac{2D^2 RTk_1(1+1/n_{13})}{L_{m1}}}\right] \quad (28)$$

it's worth mentioning that when charging state has small load current Io, since excited induction current iLm1 of first winding of the coupled inductor will operate in a non-continuous current mode, there are relative larger current harmonics comparing to continuous current mode; however, since load current Io is small, power loss due to the current harmonics has limited impact on conversion efficiency.

Mode 5: time [t4–t5], FIG. 6(e)

At time t=t4, excited induction current iLm1 of first winding of coupled inductor falls to zero, and can not control voltages cross each winding; the current can be easily affected by parasite capacitor of external semiconductor components and produces oscillation phenomenon with small current, which is helpful in reducing switching loss during switching process of the semiconductors. In first winding circuit 103, oscillation occurs due to parasite capacitor of first semiconductor switch S1 charging leakage induction Lk1 of first winding of coupled inductor; since cut off voltage vS1 of first power semiconductor switch plus cut off voltage vDc2 of first clamping diode equal to voltage vCo3 of clamping capacitor Co3, voltage vDc1 cross first clamping diode Dc1 rises along decrease of cut off voltage vS1 of first power semiconductor switch; for the same reason, the relationship between second power semiconductor S2, leakage induction Lk2 of second winding of coupled inductor and second clamping diode Dc2 is same as described above. Therefore, in the third winding circuit 105, parasite capacitor of first high voltage diode D1 oscillates with leakage induction of third winding L3, and voltage vD2 cross second high voltage diode D2 rises due to decrease of cut off voltage vD1 of first high voltage diode.

Mode 6: time [t5–t6], FIG. 6(f)

At time t=t5, excited induction current iLm1 of first winding of coupled inductor returns to zero, and finishing half cycle of the oscillation. Cut off voltage vS1 of first power semiconductor switch S1 reaches to the lowest point, and leakage induction Lk1 of first winding of coupled inductor oscillates with parasite capacitor of first power semiconductor switch S1 after obtaining energy released from parasite capacitor of first power semiconductor switch S1; in addition, the voltage cross first clamping diode Dc1 decreases along increase of cut off voltage vS1 of first power semiconductor switch S1. The relationship between second power semiconductor switch S2, leakage induction Lk2 of second winding and second clamping diode Dc2 is the same as the relationship between first power semiconductor switch S1, leakage induction Lk1 of first winding of coupled inductor and first clamping diode Dc1. Similarly, in the third winding circuit 105, parasite capacitor of first high voltage diode D1 and leakage induction of third winding L3 of coupled inductor finish later part of half cycle of the oscillation, the leakage induction of third winding L3 of coupled inductor charges the parasite capacitor of first high voltage diode D1, and voltage vD2 cross second high voltage diode D2 decreases due to increase of cut off voltage vD1 of first high voltage diode. Afterward, mode 5 and 6 will repeatedly occur, using small current to produce oscillation until first power semiconductor switch S1 and second power semiconductor switch S2 cut off.

Mode 7: time [t6–t7], FIG. 6(g)

At time t=t6, first power semiconductor switch S1 and second power semiconductor switch S2 are turned on, excited induction Lm1 of first winding of coupled inductor is again charged with energy, establishing voltage vLm1 which is coupled to second winding L2 and third winding L3. However, at beginning of transformer coupling, due to leakage induction Lk1 of first winding of coupled inductor, excited induction voltage vLm1 of first winding will be smaller than voltage k1V1; it further affects coupled voltage vN2 of second winding and voltage vN3 of third winding, such that at the moment second power semiconductor switch is turned on, second DC input voltage source V2 charges second winding L2 of coupled inductor; fortunately, this mode time t=t6–t7 is short and discharging current is small, it will not impact charging efficiency of second DC input voltage V2. At the same time, current iL3 of third winding L3 of coupled inductor provides reversal recovery current needed by second high voltage diode D2 to establish cut off voltage vD2; therefore, first high voltage diode D1 will reduces it cut off voltage vD1 once second high voltage diode D2 establishes cut off voltage vD2.

Mode 8: time [t7–t0], FIG. 6(h)

At t=t7, first high voltage diode D1 is turned on, and the polar terminal of third winding L3 has positive voltage, charging first high voltage capacitor Co1. On the other hand, current iL2 of second winding of coupled inductor is still positive (second DC input voltage V2 still keeps discharging), but slop is negative, meaning its current iL2 is gradually falling; when the current iL2 falls to zero (t=t0), finishing a switching cycle, immediately returning to mode 1.

Standalone State

When the power needed by load Ro is between the power P1d and P1c supplied by first DC input voltage V1, i.e., P1a, assuming its corresponding voltage is V1a, then the first DC input voltage V1 alone supplies power to the load, that is V1d<V1=V1a<V1c and only S1 is turned on/off; at this moment the circuit operates in a standalone state, and its working mode is as follows:

Mode 1: time [t0–t1], FIG. 8(a)

The first power semiconductor switch S1 is already turned on for a while, and during the conducting period, voltage established by excited induction Lm1 of first winding is shown in equation (8), and coupled voltages of second winding L2 and third winding L3 of coupled inductor are shown in equations (9) and (10). In the standalone state, second DC input voltage source V2 is equal to or larger than vN2=n12k1V1 and second power semiconductor switch S3 is not turned on. From equation (10), we known that the polar terminal of third winding L3 of coupled inductor has positive voltage, and first high voltage diode D1 is turned on, charging first high voltage capacitor Co1. Not only first winding L1 provides excited induction current iL3 needed by third winding L3, but also excited induction Lm1 of first winding storing energy in form of large current.

Mode 2: time [t1–t2], FIG. 8(b)

At time t=t1, first power semiconductor switch S1 is turned off; at the moment, current iL1 of first winding of coupled inductor, first, charges parasite capacitor of first power semiconductor switch S1. When voltage vS1 cross the switch is higher than voltage vCo3 of clamping capacitor Co3, first clamping diode Dc1 is turned on and charges clamping capacitor Co3, absorbing energy released by leakage induction Lk1 of first winding of coupled inductor, which reduces voltage spike occurrence cross the switch. At this time, the second power semiconductor switch S2 will not immediately establish cut off voltage vS2, due to leakage induction Lk1 and Lk2 of first winding and second winding. In addition, first high voltage diode D1 has to be kept on, to allowing current iL3 of third winding of coupled inductor continue flowing, and letting first high voltage capacitor Co1 to absorb energy released by leakage induction of third winding L3, until iL3=0.

Mode 3: time [t2–t3], FIG. 8(c)

At time t=t2, current iL3 of third winding of coupled inductor reduces to zero, excited induction current iLm1 of first winding provides reversal current to third winding L3 of coupled inductor, the current provides reversal recovery current needed for first high voltage diode D1 to cut off, to establish cut off voltage vD1; at the same time, cut off voltage vD2 of second high voltage diode D2 decreases due to increase of voltage vD1 of first high voltage diode D1. Additionally, excited induction current iLm1 of first winding provides second winding current iL2, to establish cut off voltage vS2 of second power semiconductor switch S2.

Mode 4: time [t3–t4], FIG. 8(d)

At time t=t3, cut off voltage vD2 of second high voltage diode D2 reduces to zero and is turned on, and first high voltage diode D1 cuts off. The energy stored in mode 1 by excited induction Lm1 of first winding of coupled inductor, through second high voltage diode D2, charges second high voltage capacitor Co2; its voltage vCo2 is shown as equation (20); at the same time, voltage vCo1 of first high voltage capacitor Co1 also equals to voltage vCo2; therefore, under condition of no changes in the position of polar points of first winding L1 and second winding L2 of coupled inductor, polar point of L3 switches to the other end, and the circuit still works fine, charging both first high voltage capacitor Co1 and second high voltage capacitor Co2 of third winding circuit 105, in which only charging order is different. In addition, after leakage induction Lk1 of first winding of coupled inductor is exhausted, current iL1 of first winding is zero, and clamping capacitor Co3 absorbs all the leakage induction energy, and voltage vCo3 of the clamping capacitor is shown as equation (16). The standalone state operates in continuous current mode, it voltage gain is also as shown in equation (22).

Mode 5: time [t4–t5], FIG. 8(e)

At time t=t4, first power semiconductor switch S1 is turned on, excited induction Lm1 of first winding of coupled induction once again are excited and stores energy. The current iL3 of third wining of coupled inductor, through second high voltage diode D2, releases leakage induction energy of third winding and lets second high voltage capacitor Co2 to absorb it energy. First high voltage diode D1 is still in reversal bias state, and its cut off voltage vD1 also equals to cut off voltage vD2 of second high voltage diode D2 at the moment t=t0–t2, as shown in equation (23); by observing equation (21), we know that cut off voltage vD1 and vD2 of first and second high voltage diode D1 and D2 are smaller than output voltage Vo.

Mode 6: time [t5–t0], FIG. 8(f)

At time t=t5, leakage induction energy of third winding L3 of coupled inductor releases to zero, and the current iL3 of third winding L3 of coupled inductor reverses its direction, making first high voltage diode D1 to discharge and second high voltage diode D2 to establish cut off voltage vD2. In addition, parasite capacitor of second power semiconductor switch S2 starts releasing voltage, and cut off voltage vS2 decreases but in non-conducting state. At the moment (t=t0) first high voltage diode D1 is turned on, switching cycle is completed, and working mode immediately returns to mode 1.

As aforementioned, the present invention designates first DC input voltage source V1 as preferred first supplier, therefore, standalone state operates during first power semiconductor switch S1 is turned on/off, while second power semiconductor switch S2 is turned off; if first DC input voltage source V1 is in need of repair or inspection, standalone state can operates during second power semiconductor switch S2 is turned on/off also, its working theory is same as shown in FIGS. (7) and (8), and no need repeat.

Normally, the converter operates in continuous current mode and voltage boost gain will follow equation (22). Let coupling coefficient k1=0.96, for winding ratio n13 to be 4, 6 and 8, duty cycle D and converter voltage gain curve Gv1 are shown in FIG. 9(a). In FIG. 9(a), the * is voltage gain curve of the present invention while solid line is voltage gain curve of conventional coupling inductor circuit. Observing the two curves, to the same winding ratio, one can see that the present invention has higher voltage gain than conventional coupling inductor circuit, because the present invention fully utilizes the winding voltage on high voltage side. In FIG. 9(a), let n13=6, coupling coefficient k1 gradually increases from 0.9 to 1, duty cycle D and converter voltage gain curve Gv1 are shown in FIG. 9(b). From FIG. 9(b), one can see that the coupling coefficient k1 has minimum impact on voltage gain Gv1; therefore, we can assume coupling coefficient k1 be 1 in order to simplify analysis process. Substitute k1=1 into equation (22), voltage gain Gv1 can be simplified to $$G_{V1} = \frac{V_o}{V_1} = \frac{1+n_{13}}{1-D} \quad (29)$$

Substitute k1=1 into equation (16), cut off voltage vS1 of first power semiconductor switch S1 can be simplified to $$v_{S1} = V_1/(1-D) \quad (30)$$

Then Substitute equation (30) into equation (29), voltage beard on first power semiconductor switch S1 will be $$v_{S1} = V_o/(1+n_{13}) \quad (31)$$

From equation (31), if fixing DC output voltage Vo and winding ratio n13, cut off voltage vS1 of first power semiconductor switch S1 is not related to first DC input voltage source V1 and duty cycle D, which guaranties voltage taken by the switch will be a fixed value. When first DC input voltage source V1 is not higher than break down voltage of first power semiconductor switch, the converter designed according to equation (31), utilizing its high voltage gain, will be able to handle large voltage variation of low voltage DC input voltage source, such as, cell battery, solar battery and etc.

The present invention is improved on techniques used by conventional circuits and publications and its advantages are as follows:

1. Multiple Input Mechanism. The present invention shows a high efficiency single-stage multi-input bidirectional converter, which can use different kinds of voltage sources as inputs working together to boost voltage; it simplifies a structure in which multiple conversions are used to boost voltage and then connected in parallel to provide power. Based on characteristics of multiple voltage sources, each winding ratio of coupled inductor is chosen and using single iron core, which allows multiple voltage sources to be transferred to a load.

2. High Voltage Gain. The coupled inductor only needs low winding ratio and lenient control on duty cycle to have high voltage gain, which is higher than that of conventional coupled inductor structure, because the present invention fully utilizes winding voltage on high voltage side.

3. Charging Route with Low Voltage Conversion, and High Charging Efficiency. Utilizing characteristic of specific voltage source to design auxiliary power system, and no addition charging route is needed, which avoids power loss in multiple stage conversion of conventional auxiliary system, by using synchronous rectification technique to reduce conduction loss.

4. All the Switches and Diodes have Voltage Clamping Function. There is no problem in short current during switch being turned on and high reversal recovery current of diodes, and no snubber circuit is required either.

5. High Conversion Efficiency. Under no separation structure, depending on characters of either low voltage large current or high voltage small current, low cost high efficiency power components with proper voltage ranges can be chosen respectively.

6. The Voltage Beard by Switches Is Not Related to Input Voltage. The voltage beard by power semiconductor switches is only related to output voltage and winding ratio of coupled inductor, which is well suited for DC input voltage having large voltage variation. It is worth noting that necessary condition is that DC input voltage can not be higher than break down voltage of power semiconductor switches.

These features and advantages of the present invention will be fully understood and appreciated from the following detailed description of the accompanying Drawings.

DETAILED DESCRIPTION OF THE PREFERRED EMBODIMENT

Figure 10:
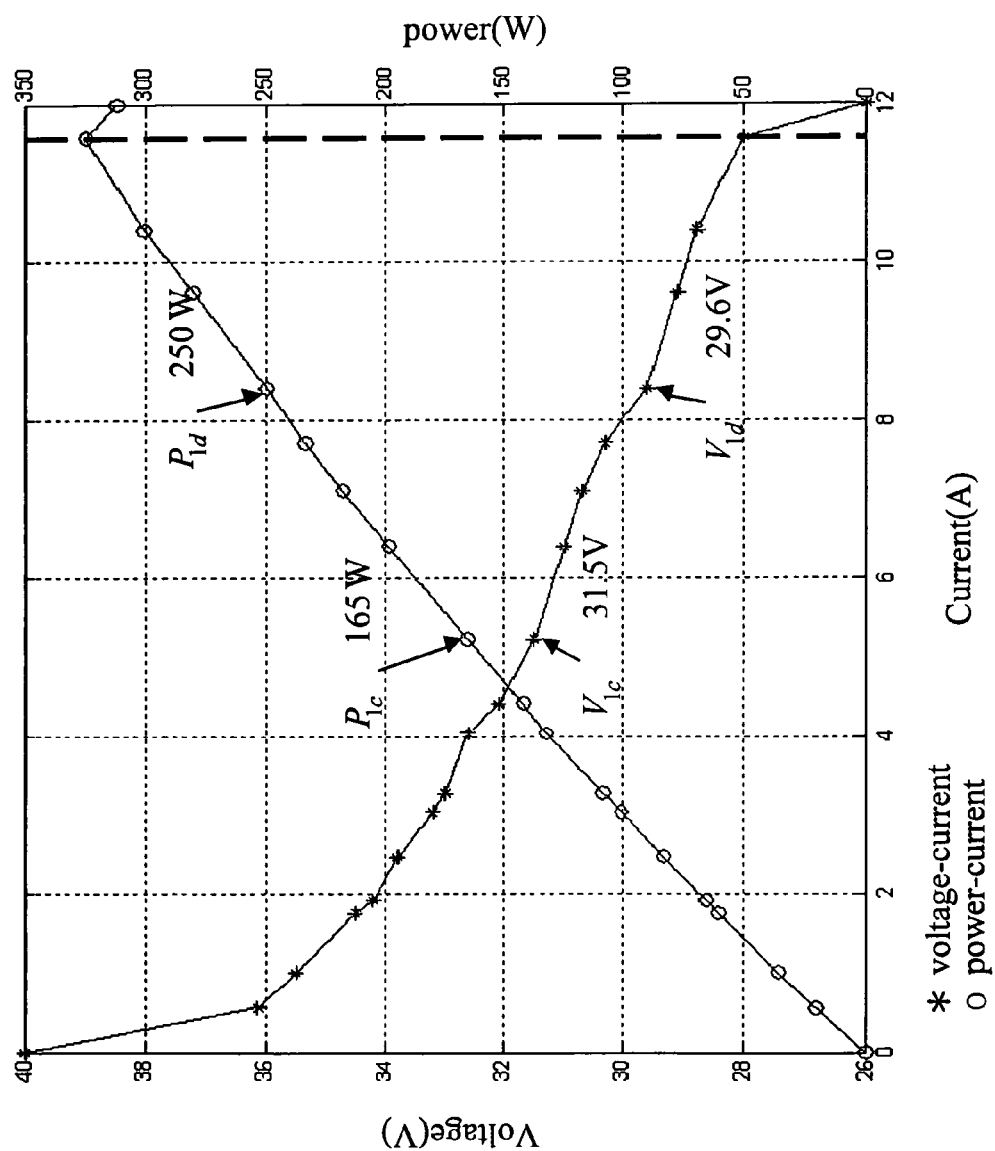
FIG. 10 is one of preferred embodiments of the high efficiency single-stage multi-input bi-directional converter of the present invention. First CD input voltage source is fuel cell battery.

In the high efficiency single-stage multi-input bi-directional converter of the present invention, first CD input voltage source V1 is PowerPEM™-PS250 fuel cell battery made by H-Power Co., its specified power is 250 W and its characteristic is shown in FIG. 10. To have the embodiment fully elaborate aforementioned theoretical analysis, depending on each state, first DC input voltage source V1 is chosen as its power P1$d$=250 W, corresponding voltage V1$d$=29.6V; power P1$c$=165 W, and corresponding voltage V1$c$=31.5V. In addition, two group 12V rechargeable batteries connected in series to form a 24V rechargeable battery is chosen as second DC input voltage source V2. When power needed by a load Ro exceeds the specified power P1$d$=250 W, the rechargeable battery provides power P2$d$ to the load Ro, and this is the discharging state; when the load Ro need smaller power, the rechargeable battery is charged, in which the power used by the load Ro plus the battery charging power P2$c$ are provided by the first DC input voltage source; in such state, maximum power P1$c$ can be provide by first DC input voltage source V1 is 165 W, and this is the charging state; when the power needed by the load Ro is between power P1$d$=250 W and P1$c$=165 W provided by first DC input voltage source V1, first DC input voltage source V1 alone provide power to the load, and this is the standalone state. Charging/discharging control and drive circuit 108 will decide switching states of first and second power semiconductor switches S1 and S2 in the three states. According to characteristics of 250 W fuel cell battery and 24V rechargeable battery, and considering effects from saturation voltage of the rechargeable battery, leakage induction Lk1 and Lk2 of coupled inductor, winding ratio n12 is set to N2/N1=6/7.

Figure 1:
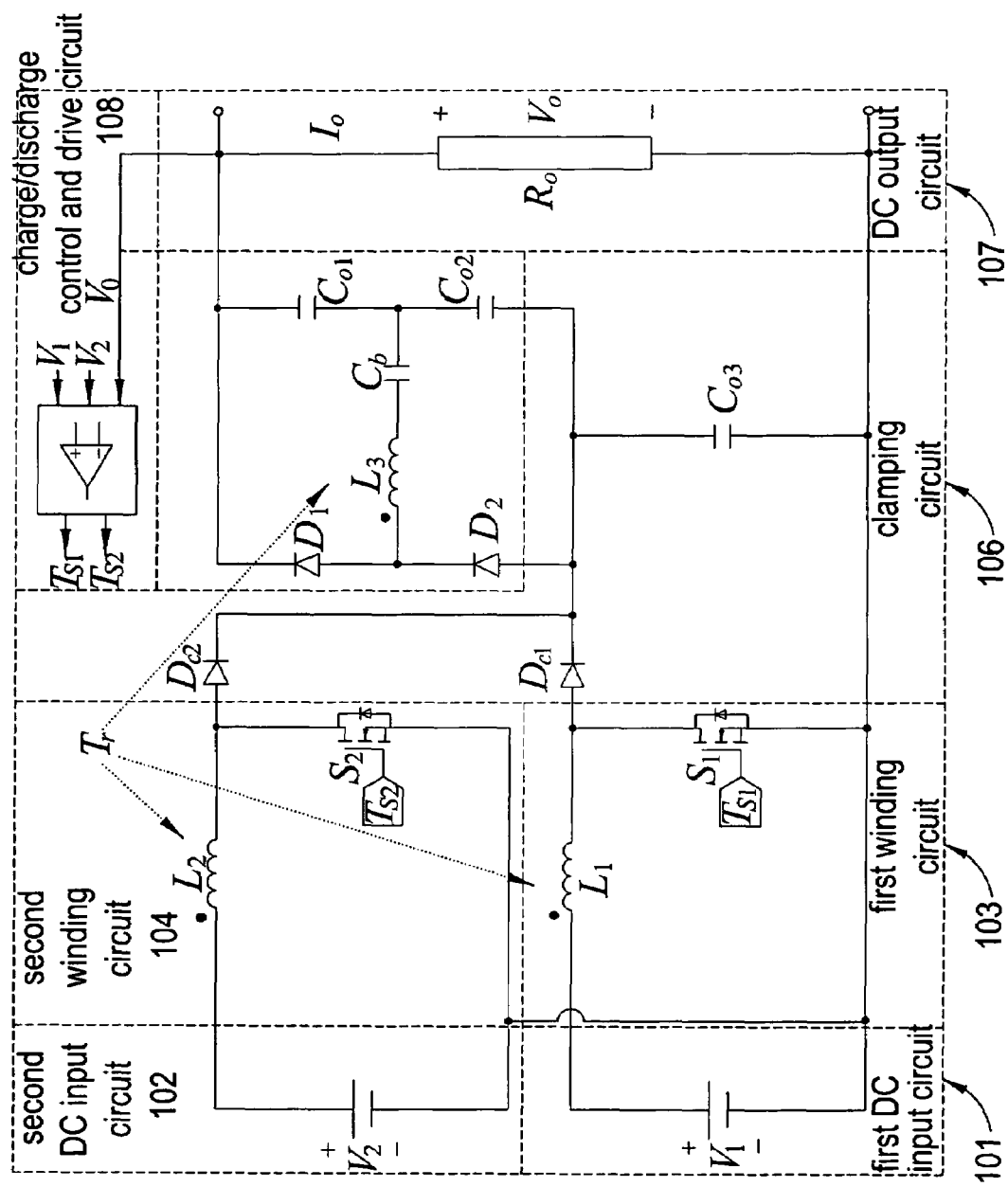
FIG. 1 is the high efficiency single-stage multi-input bi-directional converter of the present invention.
Figure 2:
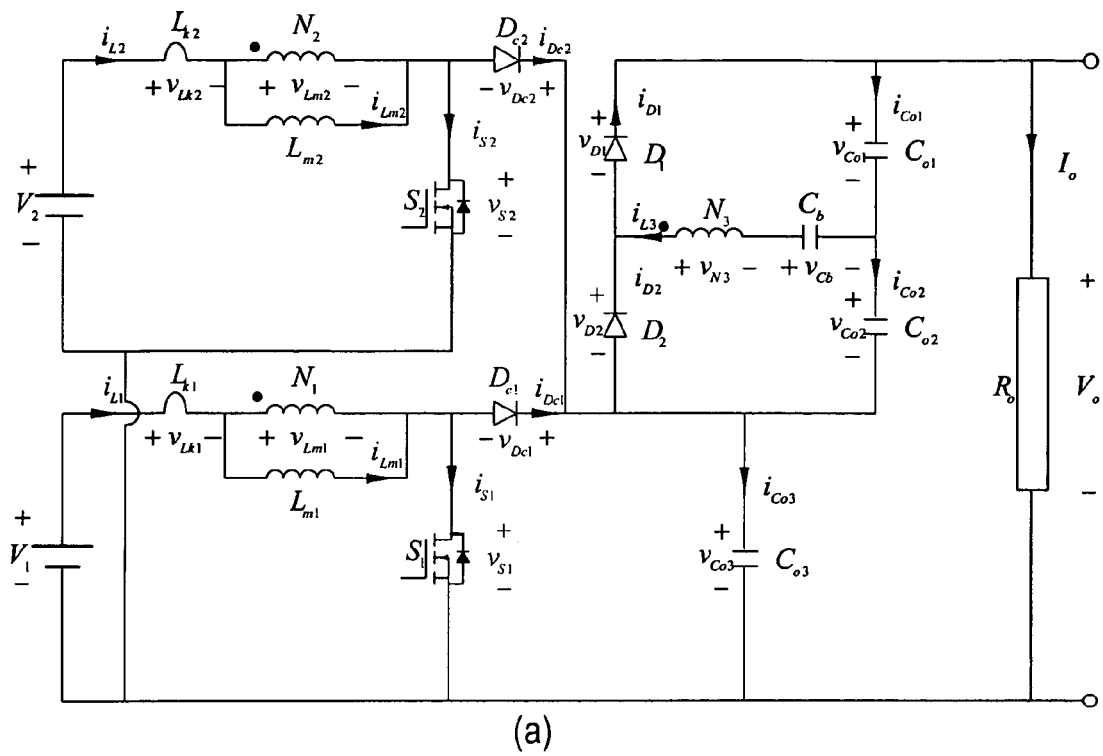
FIG. 2 is an equivalent circuit of the high efficiency single-stage multi-input bi-directional converter. (a) an equivalent circuit in discharging state; (b) an equivalent circuit in standalone and charging state.
Figure 2:
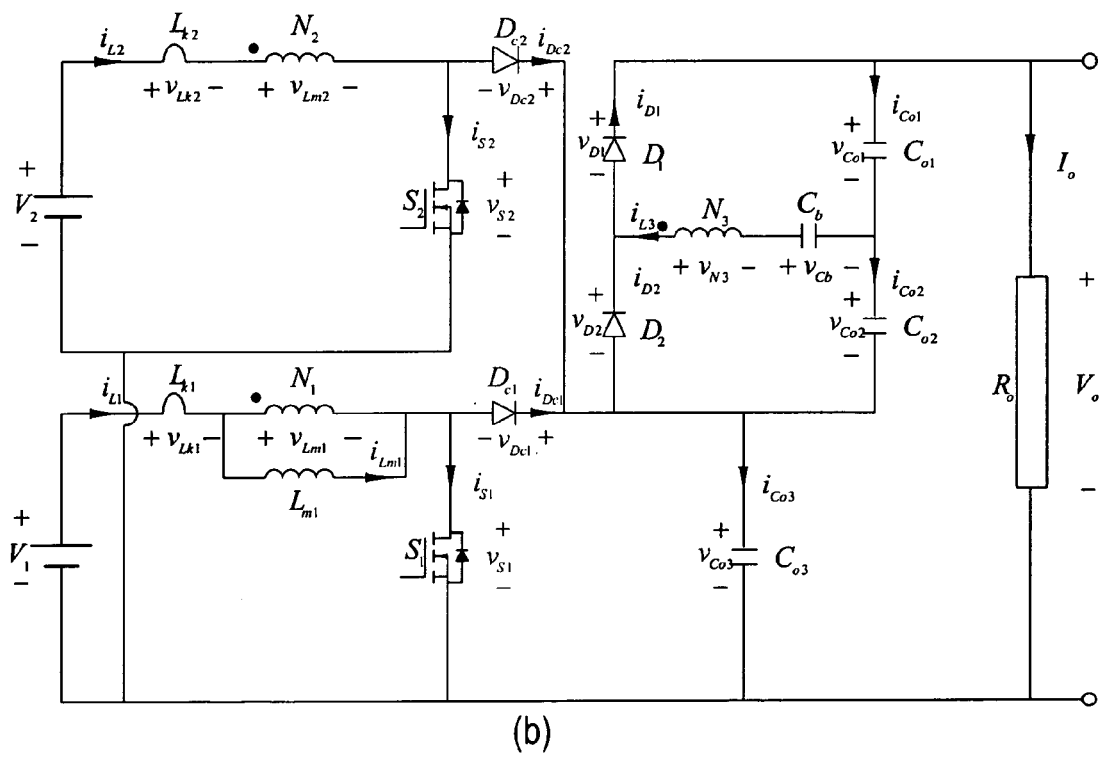
Figure 3:
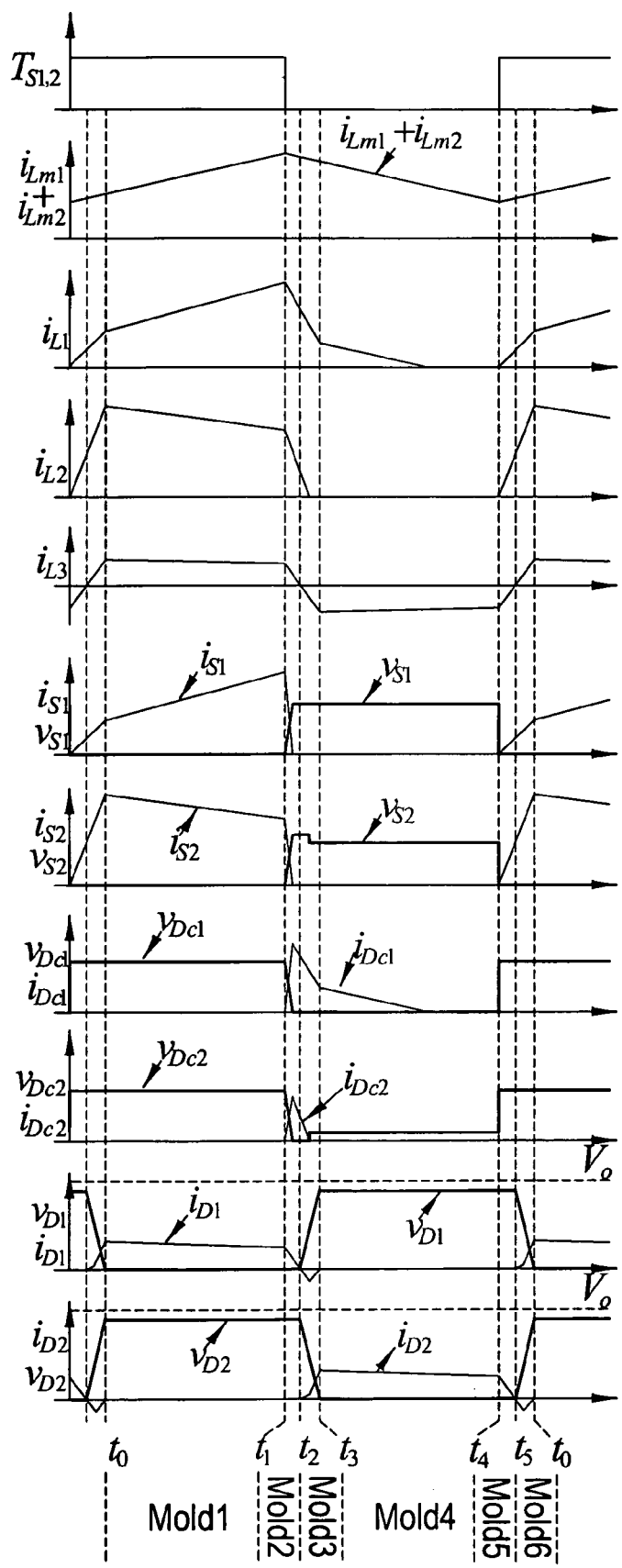
FIG. 3 is time line of the high efficiency single-stage multi-input bi-directional converter in discharging state.
Figure 4:
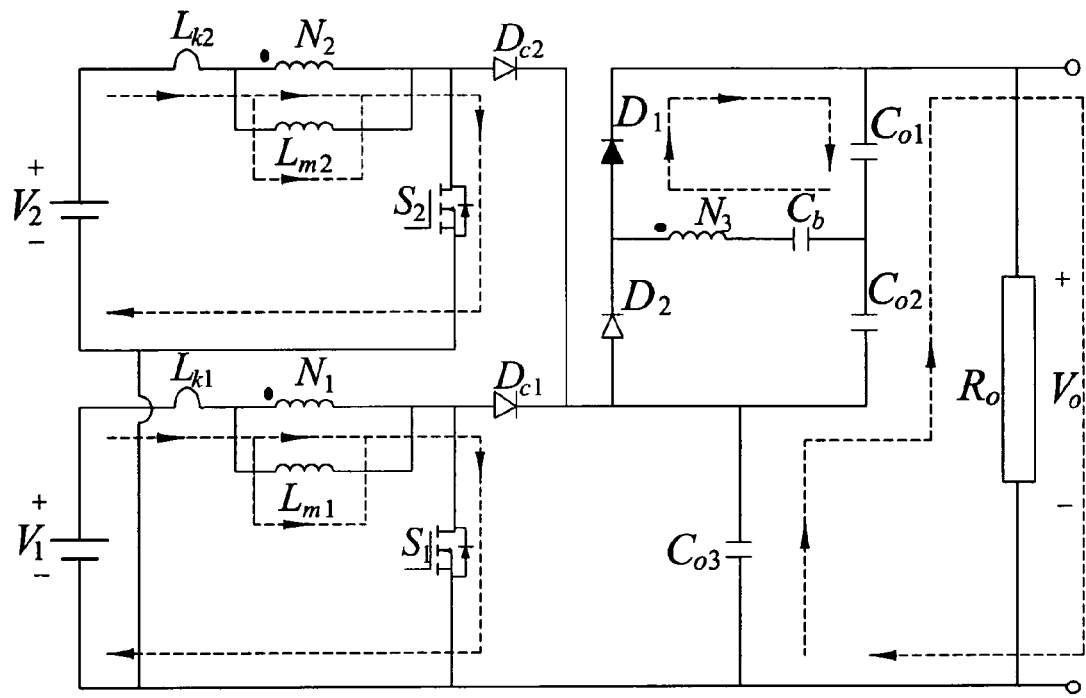
FIG. 4 is working mode of the high efficiency single-stage multi-input bidirectional converter in discharging state.
Figure 4:
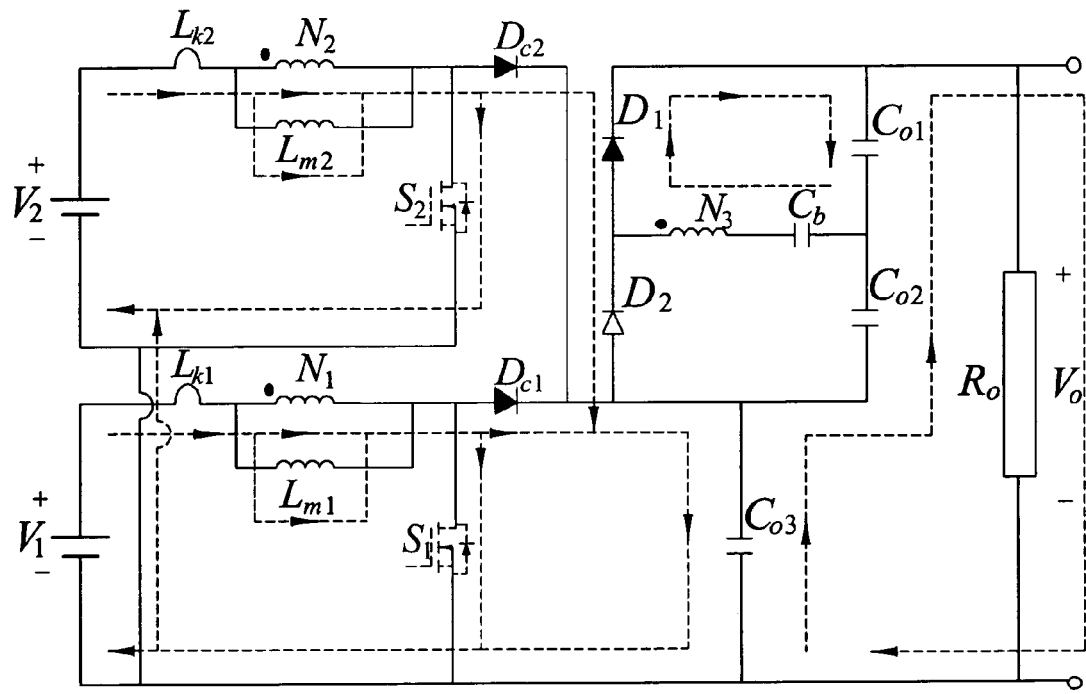
Figure 4:
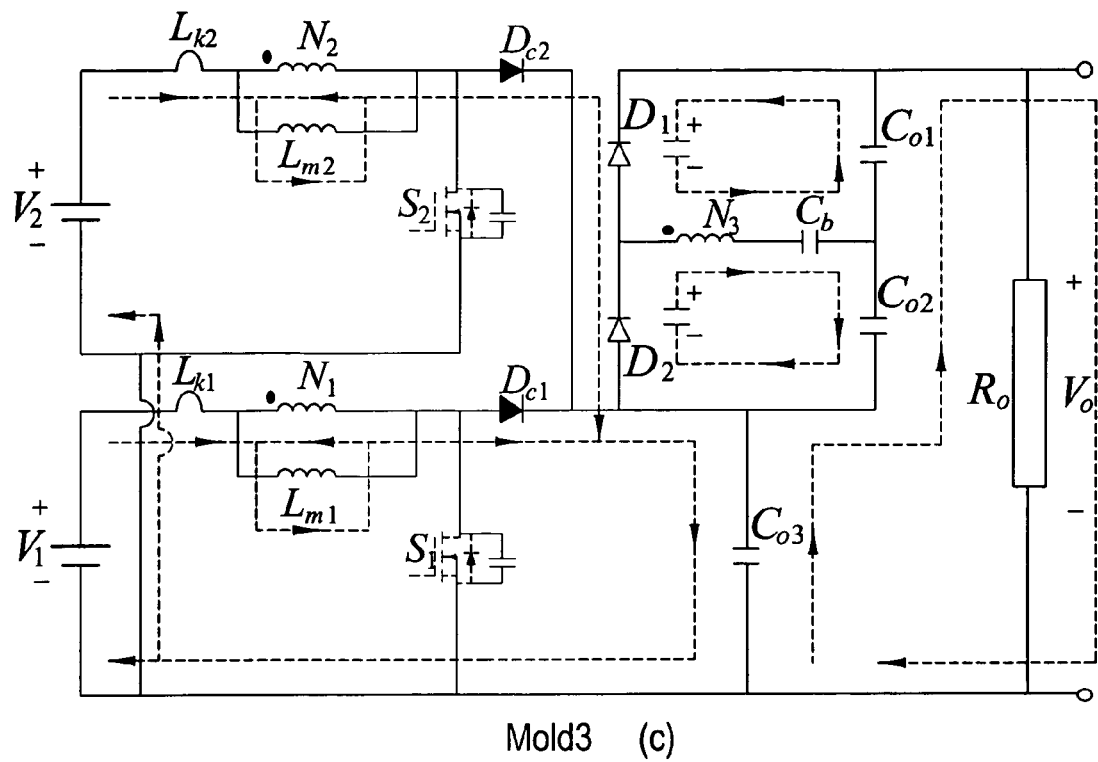
Figure 4:
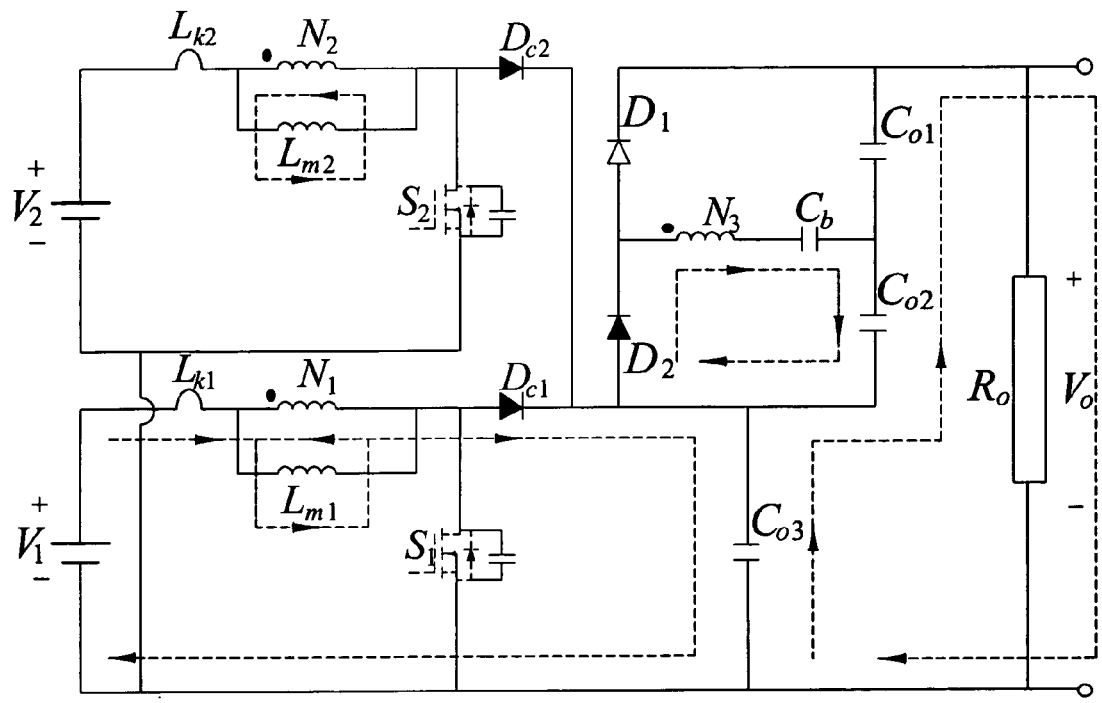
Figure 4:
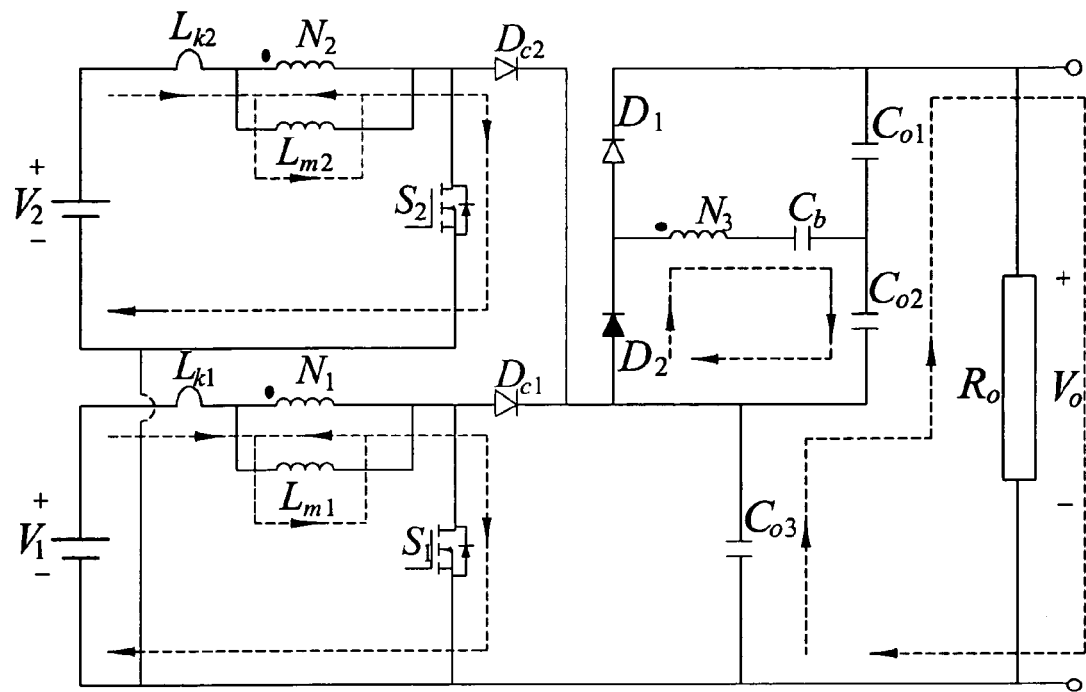
Figure 4:
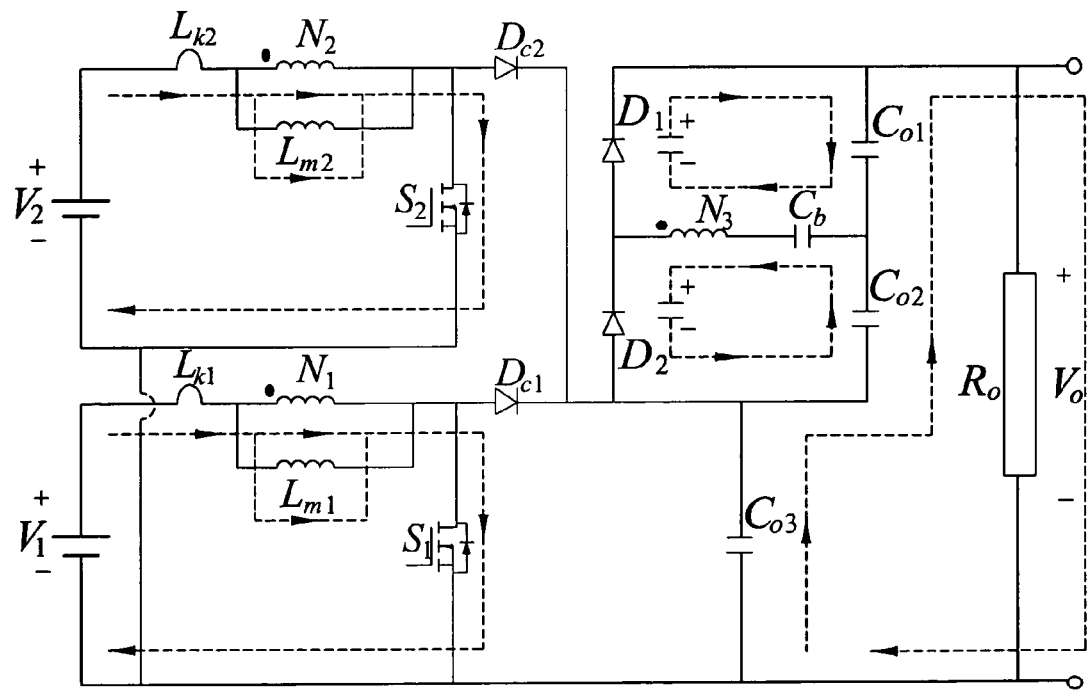
Figure 5:
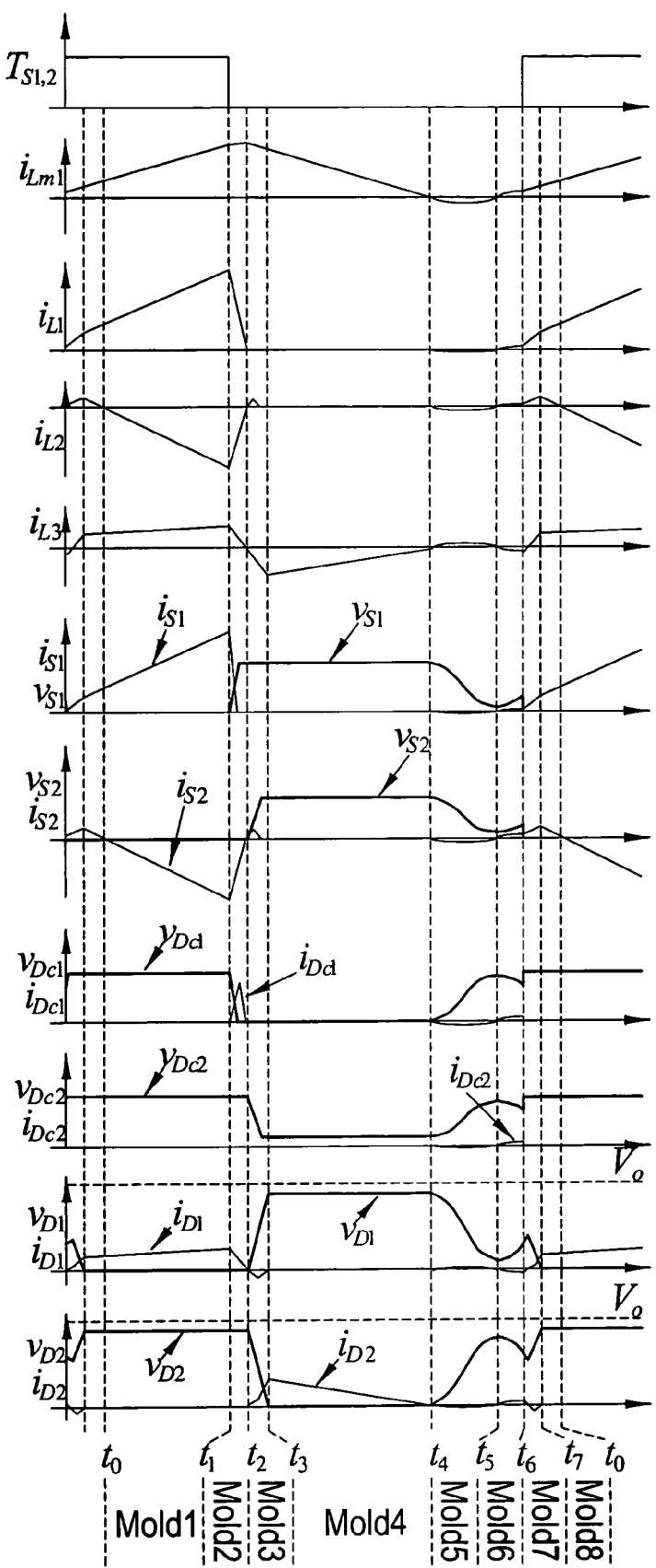
FIG. 5 is time line of the high efficiency single-stage multi-input bidirectional converter in charging state.
Figure 6:
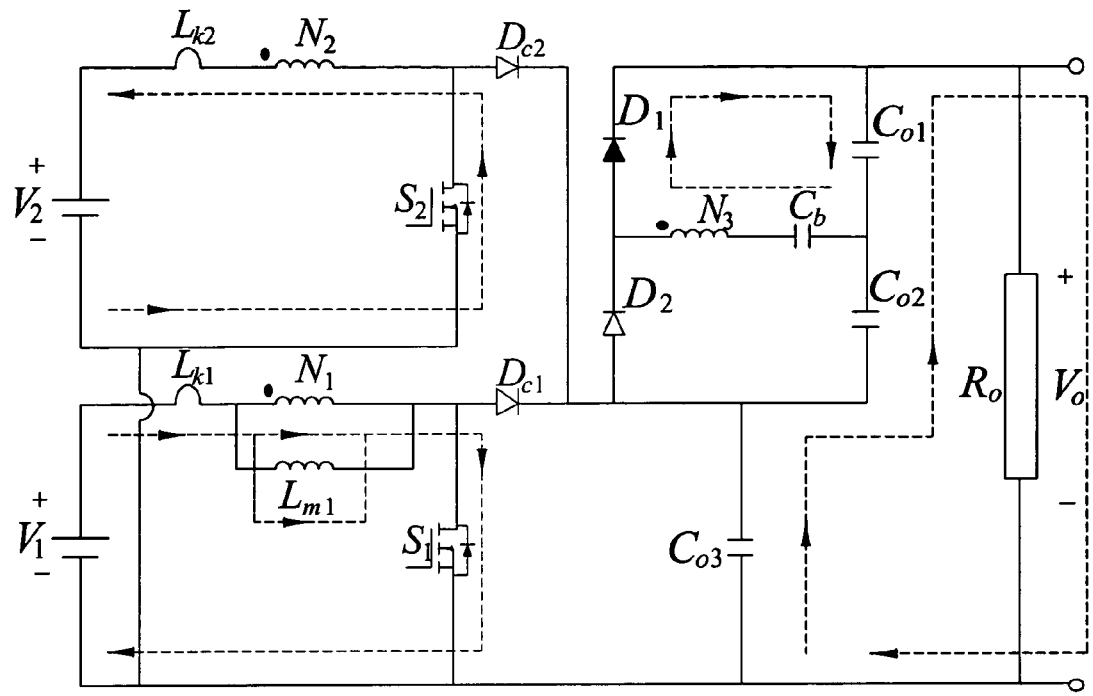
FIG. 6 is working mode of the high efficiency single-stage multi-input bidirectional converter in charging state.
Figure 6:
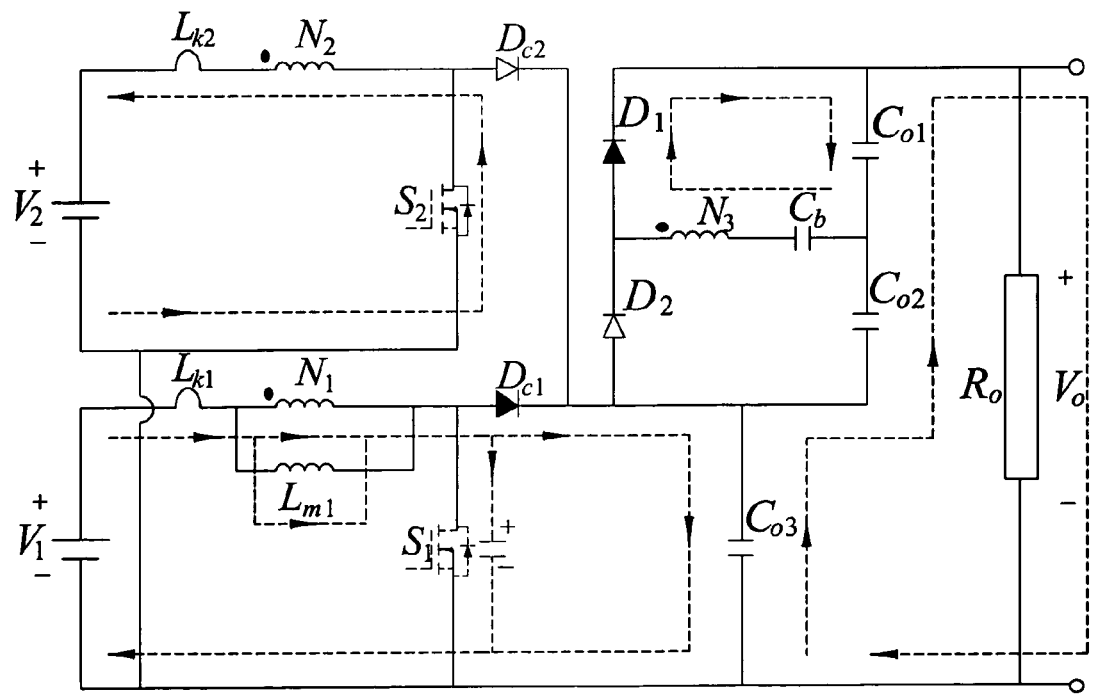
Figure 6:
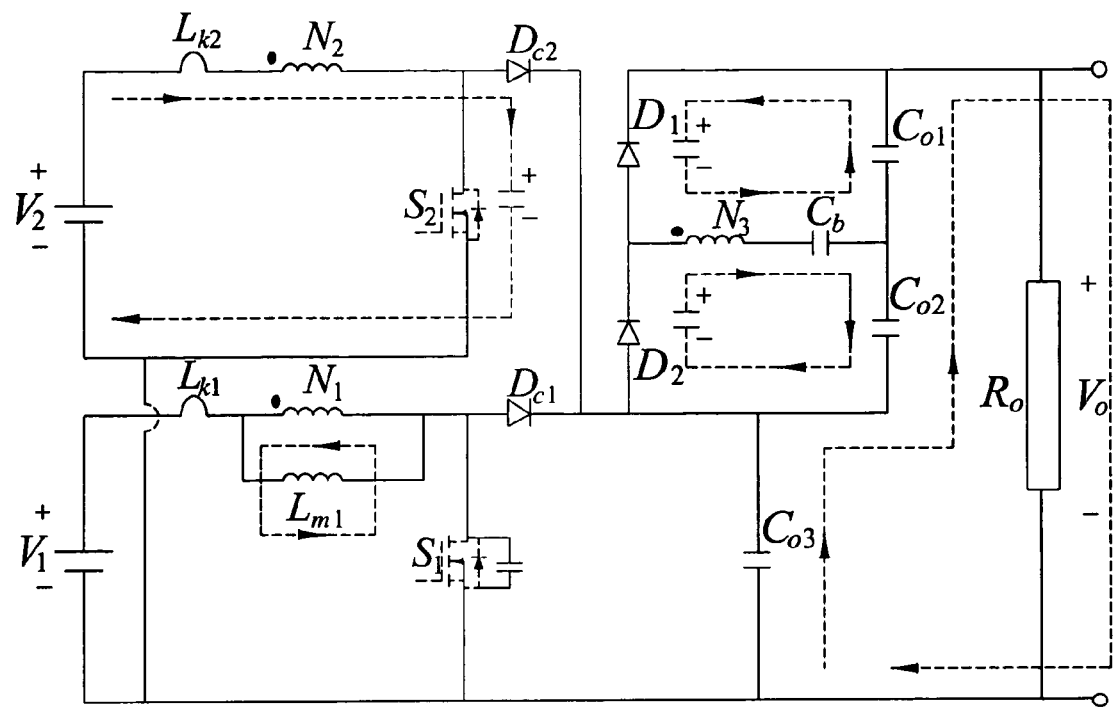
Figure 6:
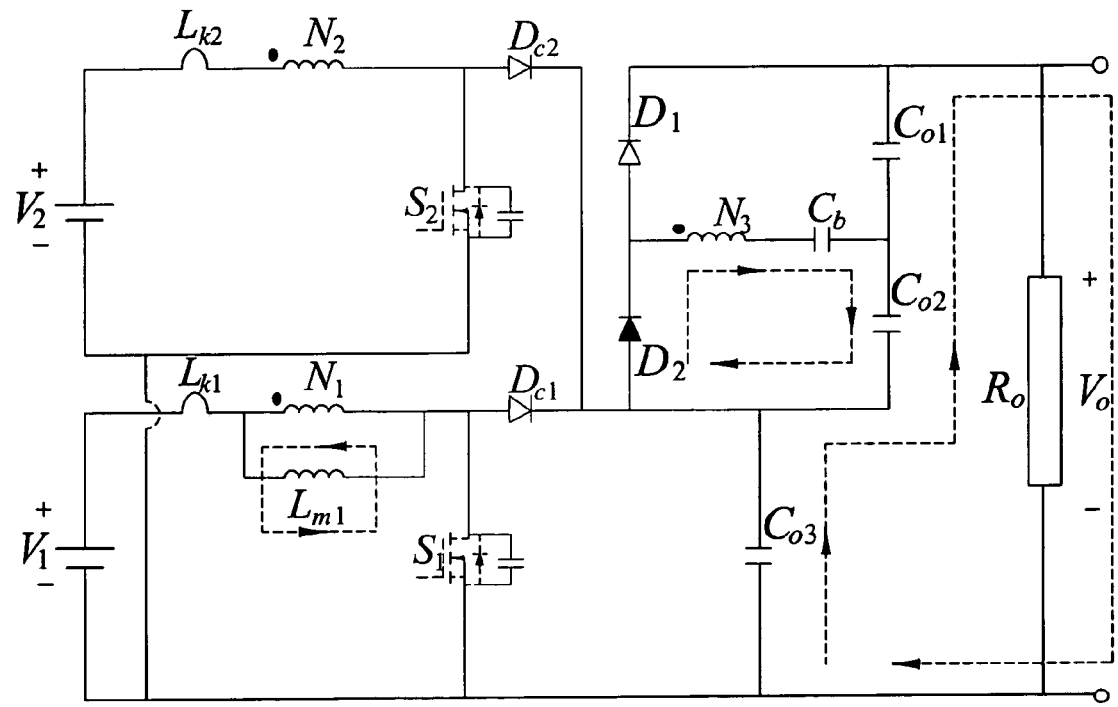
Figure 6:
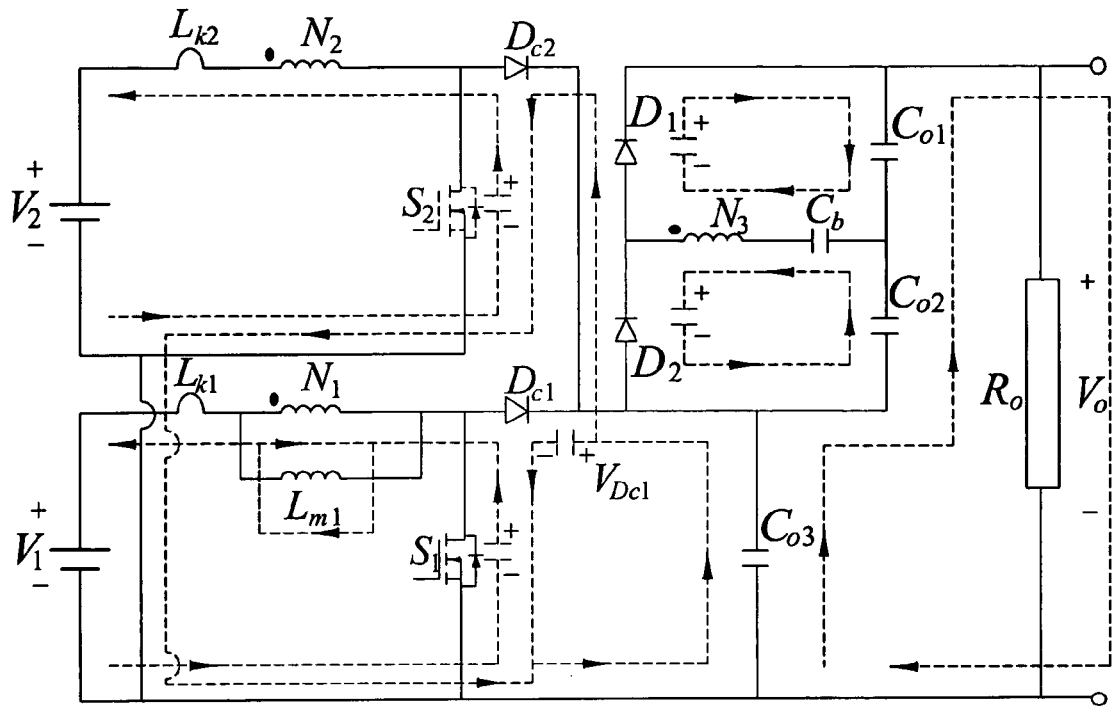
Figure 6:
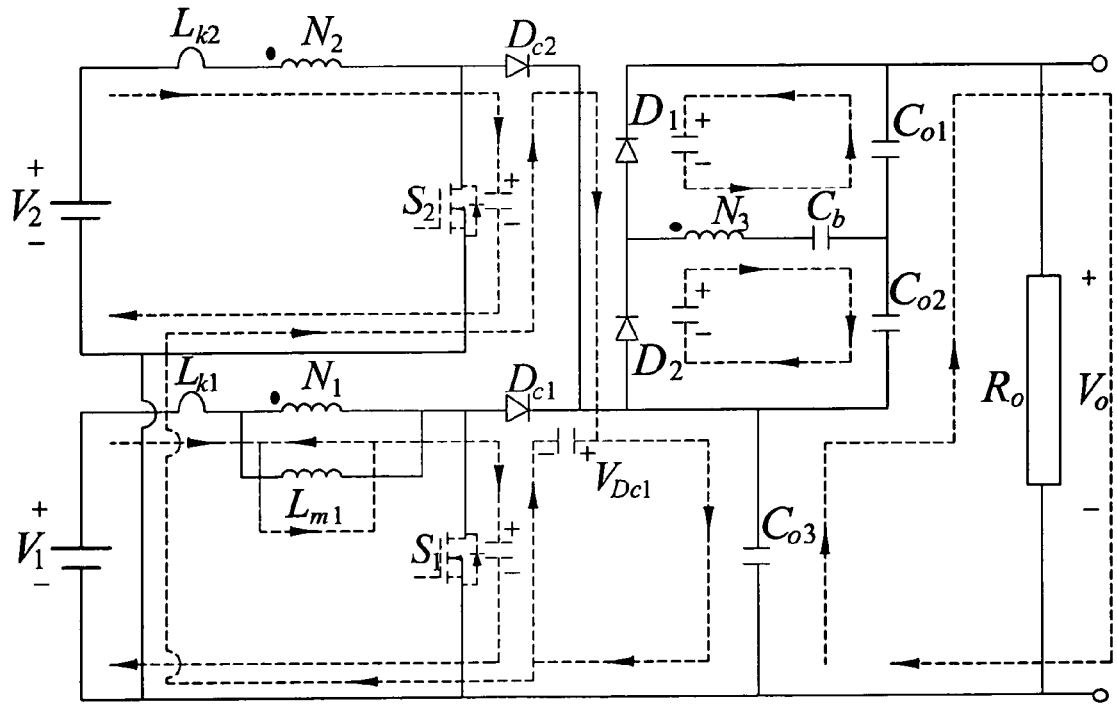
Figure 6:
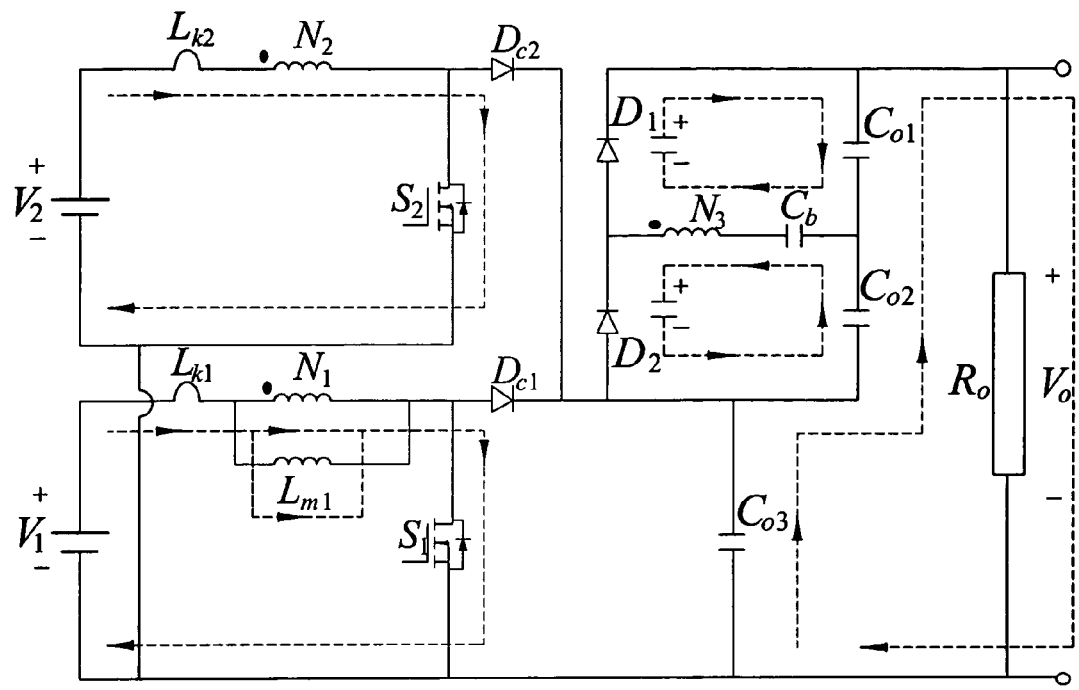
Figure 6:
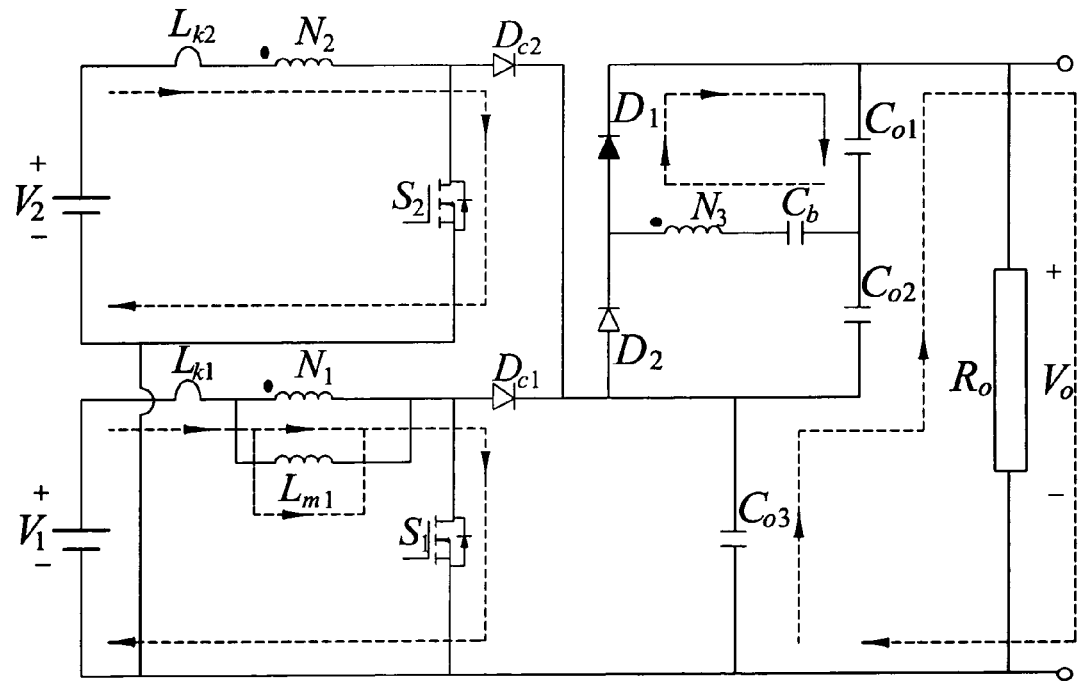
Figure 7:
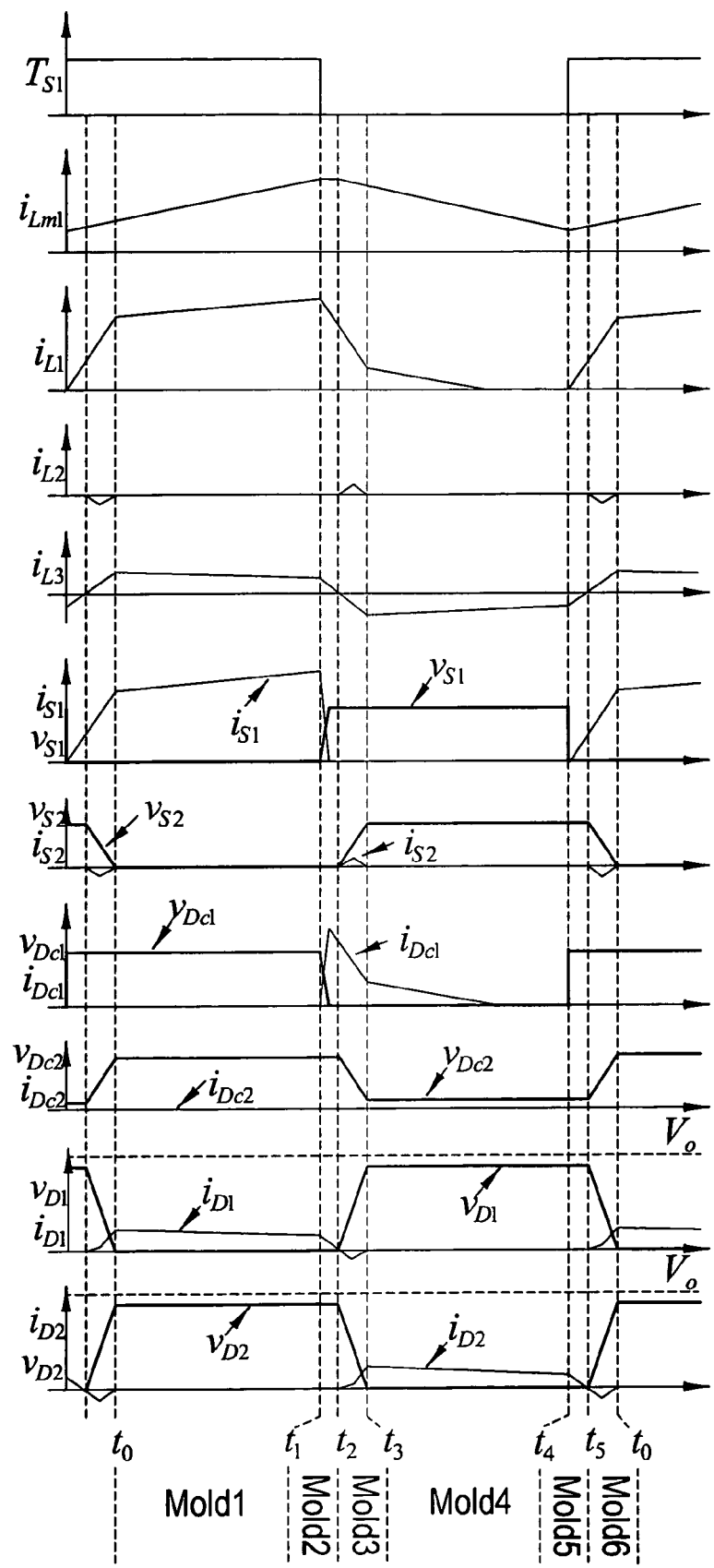
FIG. 7 is time line of the high efficiency single-stage multi-input bidirectional converter in standalone state.
Figure 8:
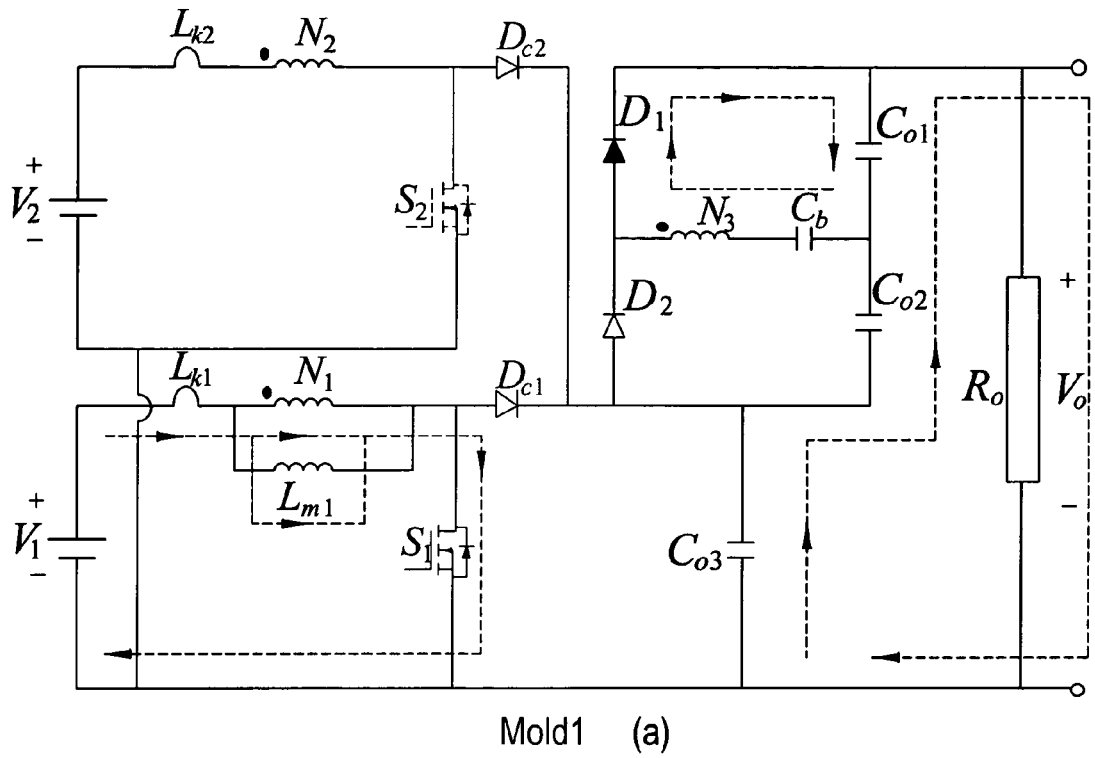
FIG. 8 is working mode of the high efficiency single-stage multi-input bi-directional converter in standalone state.
Figure 8:
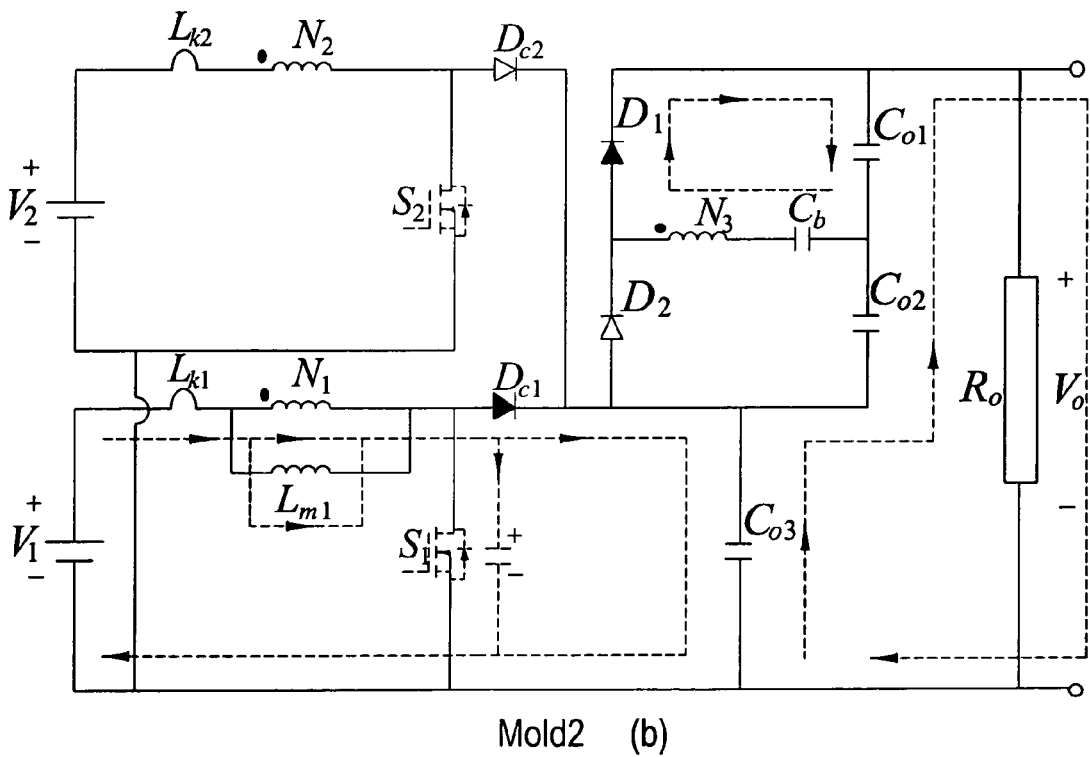
Figure 8:
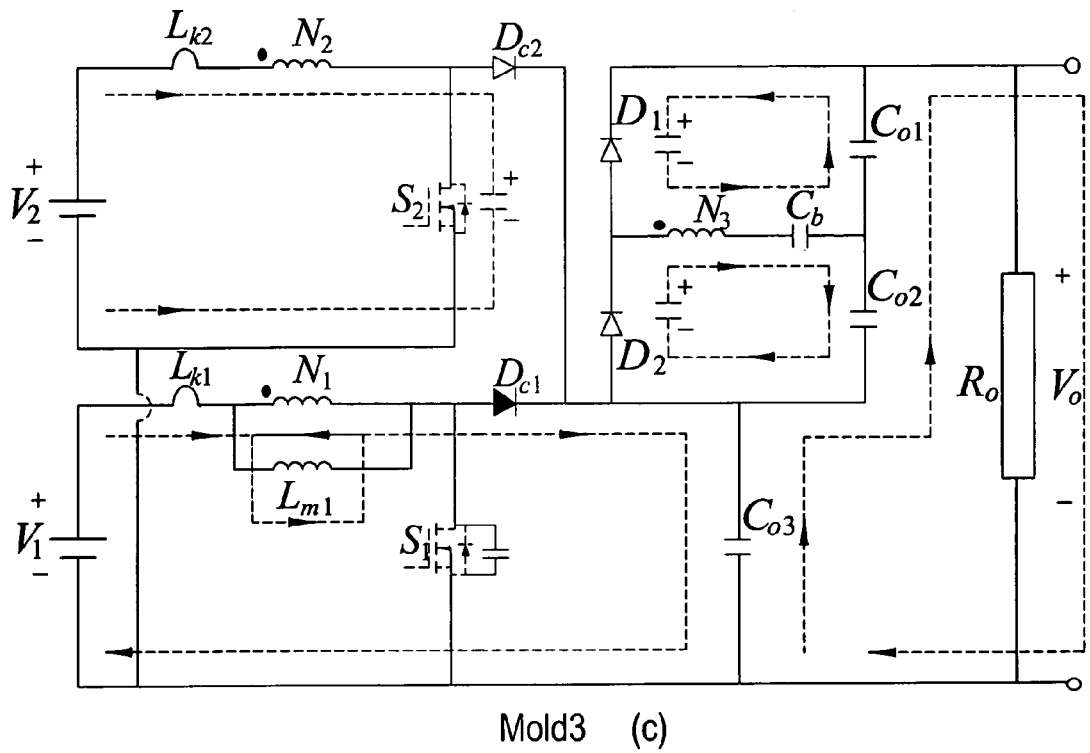
Figure 8:
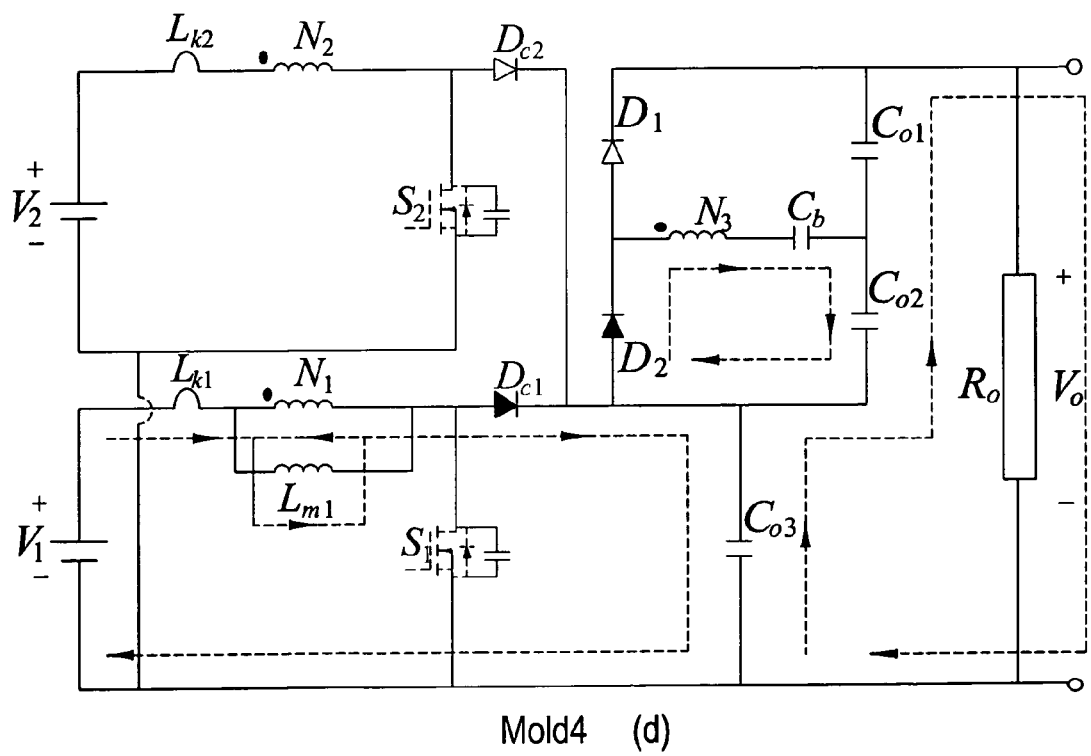
Figure 8:
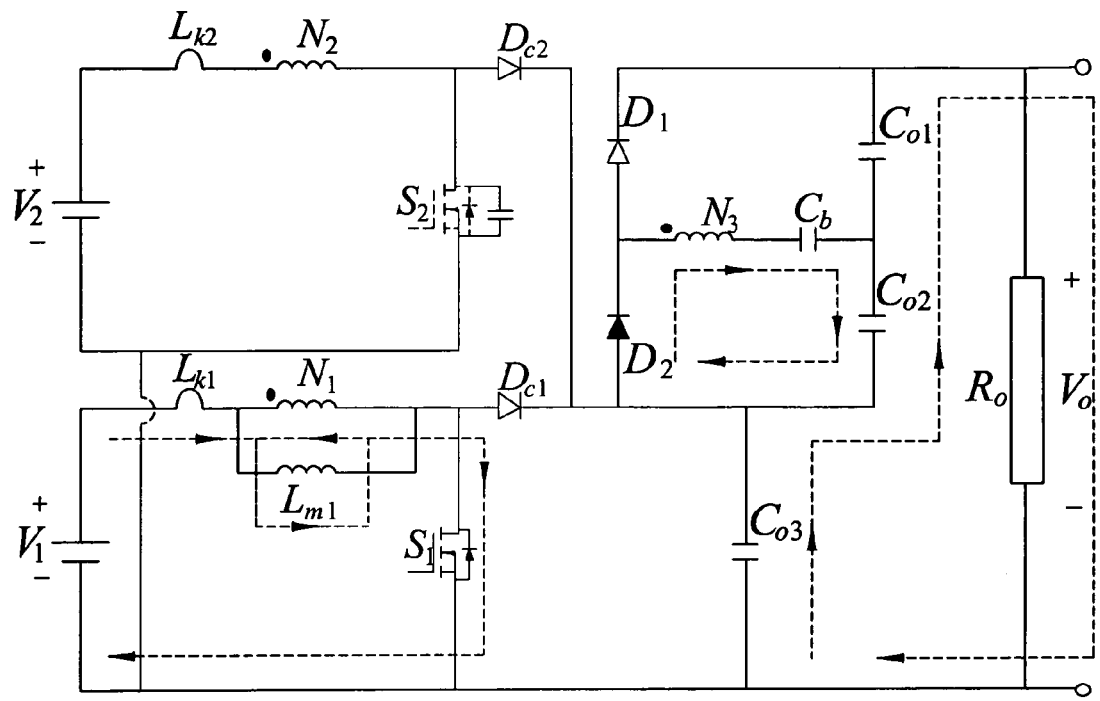
Figure 8:
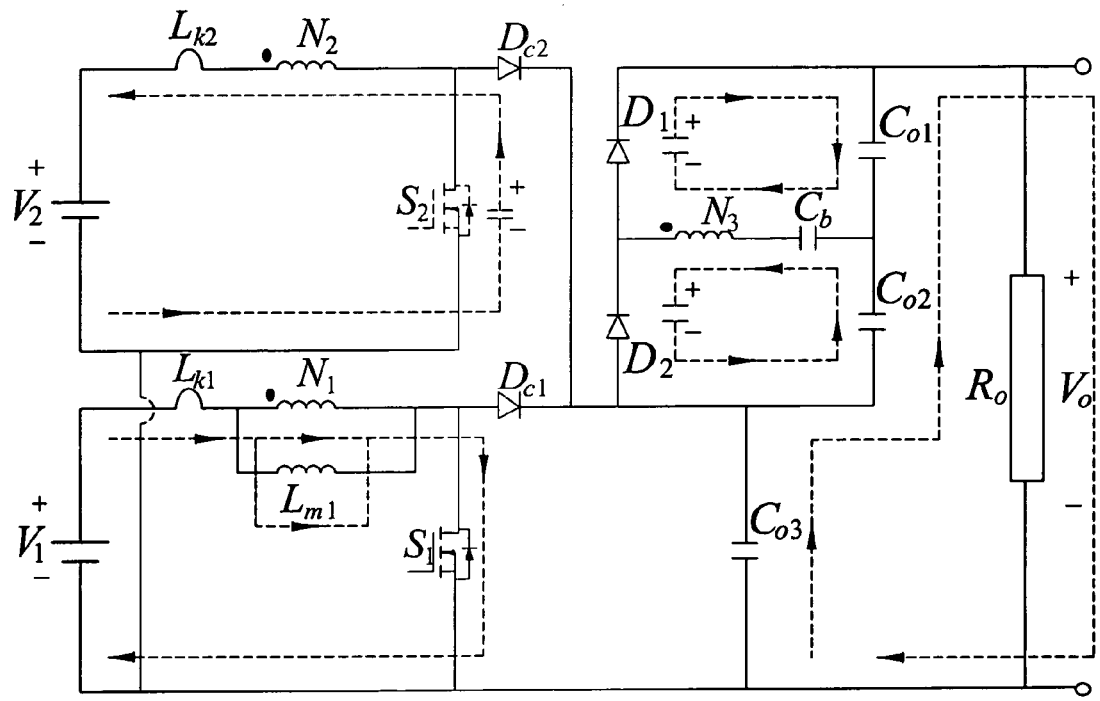
Figure 9:
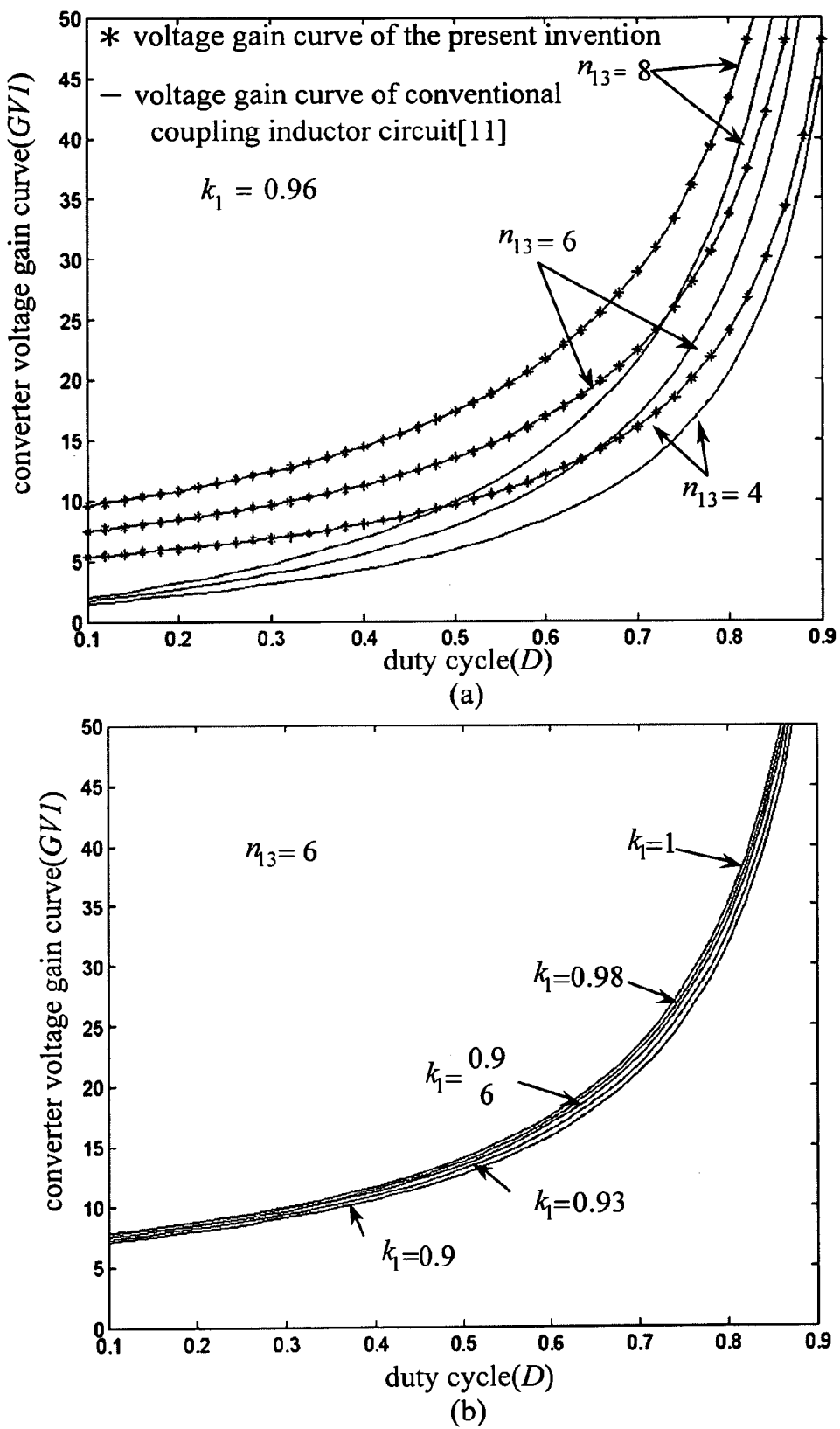
FIG. 9 is the voltage gain curves of the high efficiency single-stage multi-input bidirectional converter and conventional coupled inductor circuit. (a) coupling coefficient k1=0.96, for different winding ratio, duty cycle D and converter voltage gain curves; (b) winding ratio n13=6, coupling coefficient k1 changing from 0.9 to 1, duty cycle D and converter voltage gain curves.

When switch's duty cycle D is about 0.5, conducting currents in each circuit components have relative small harmonics; specially, because conducting switches are complementary components, the effects are more prominent; for example, first power semiconductor switch S1 pairs with first clamping diode Dc1 , first high voltage diode D1 pairs with second high voltage diode D2, and etc; from FIG. 10, we know that normal operating voltage of fuel cell battery is about 30V, and assume DC output voltage Vo is 400V, using equation (29) to obtain n13, and making it to integer N3/N1=6. Substitute Vo=400V and n13=6 into equation (31), we get that clamping voltage vS1 of first power semiconductor switch S1 is about 57V; and as to clamping voltage vS2 of second power semiconductor switch S2, considering under idealized condition k1$\alpha$1 and k2$\alpha$1, according to equation (16) and (17), we can deduct vS2/vS1=n12; therefore, when n12=6/7 little less than 1, its clamping voltage vS2 is little less than clamping voltage vS1 of first power semiconductor switch S1. Hence, first power semiconductor switch S1 and second power semiconductor switch S2 both choose the same level of voltage specification, and preferred embodiments use MOSFET, serial number IRFB4710, conducting resistance RDS(on), max=14 m$\Omega$, break down voltage is 100V and specified current is 75 A, package model TO-220AB. And the switching frequency is 100 kHz, and rest specifications are as follows:

$V_1$: 28~36V
$V_2$: 24V
$V_o$: 400V
$T_r$: $N_1$:$N_2$:$N_3$=7T:6T:42T; $L_1$=15.2 μH; $L_2$=11 μH; $L_3$=534.1 μH; $L_{k1}$=0.5 μH; $L_{k2}$=0.2 μH; $k_1$=0.967; $k_2$=0.98; core: EE-55
$S_1$ and $S_2$: IRFB4710, 100V/75 A , Standard value $R_{DS(on)}$=11 m$\Omega$, Max $R_{DS(on)}$=14 m$\Omega$, TO-220AB
$D_1$ and $D_2$: SF1006G , 400V/10 A , TO-220
$D_{c1}$ and $D_{c2}$: SR20100, 100V/20 A, Schottky diode, TO-220
$C_b$: 13.6 μF
$C_{o1}$: 20 μF
$C_{o2}$: 20 μF
$C_{o3}$: 60 μF To further understand the present invention, please see FIG. 2 for embodiment's waveforms, voltage and current symbols of circuit components.

Figure 11:
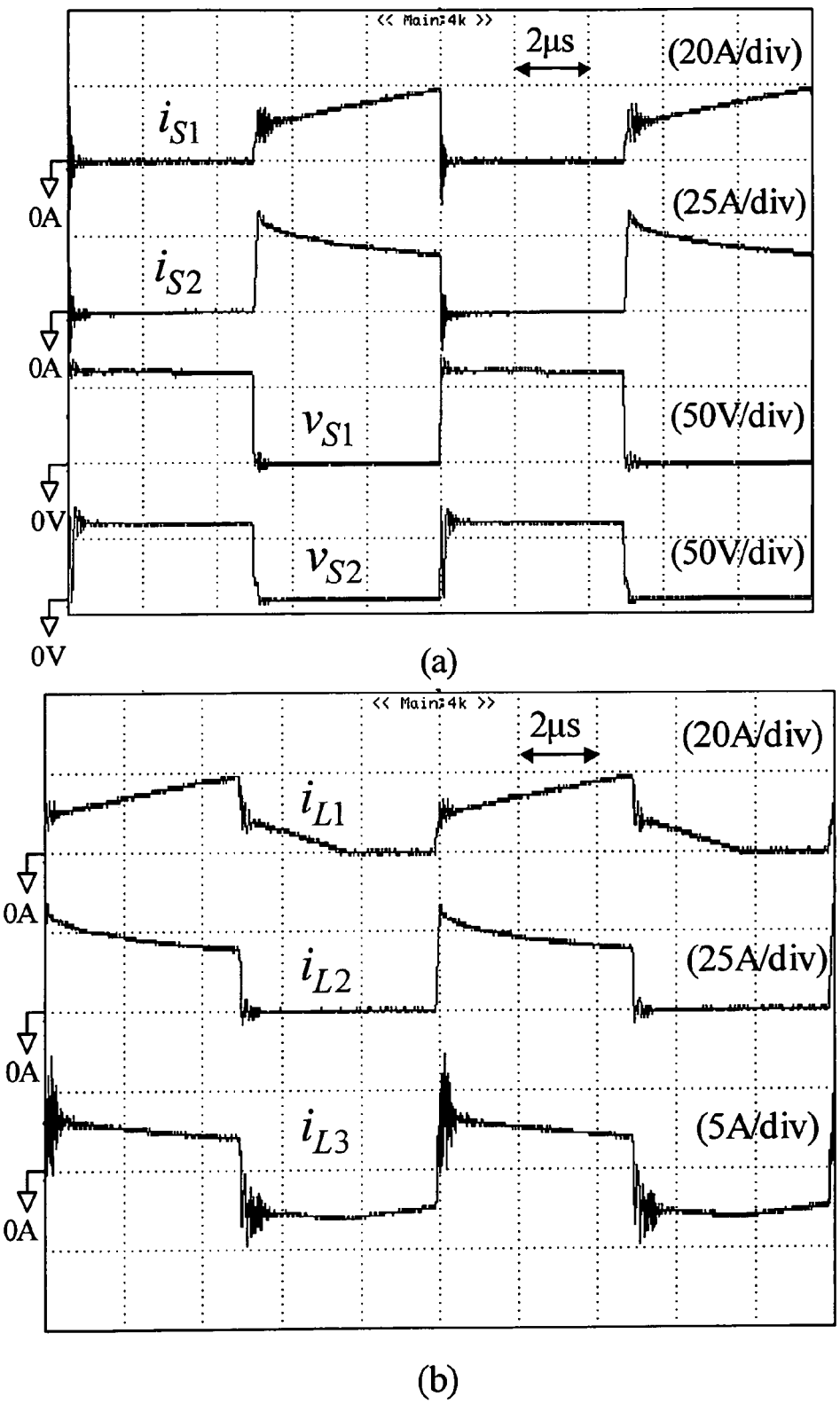
FIG. 11 is another one of preferred embodiments of the high efficiency single-stage multi-input bi-directional converter of the present invention. It shows waveforms of each component in discharging state when output power of DC output circuit is 513 W and output power of fuel cell is 250 W.
Figure 11:
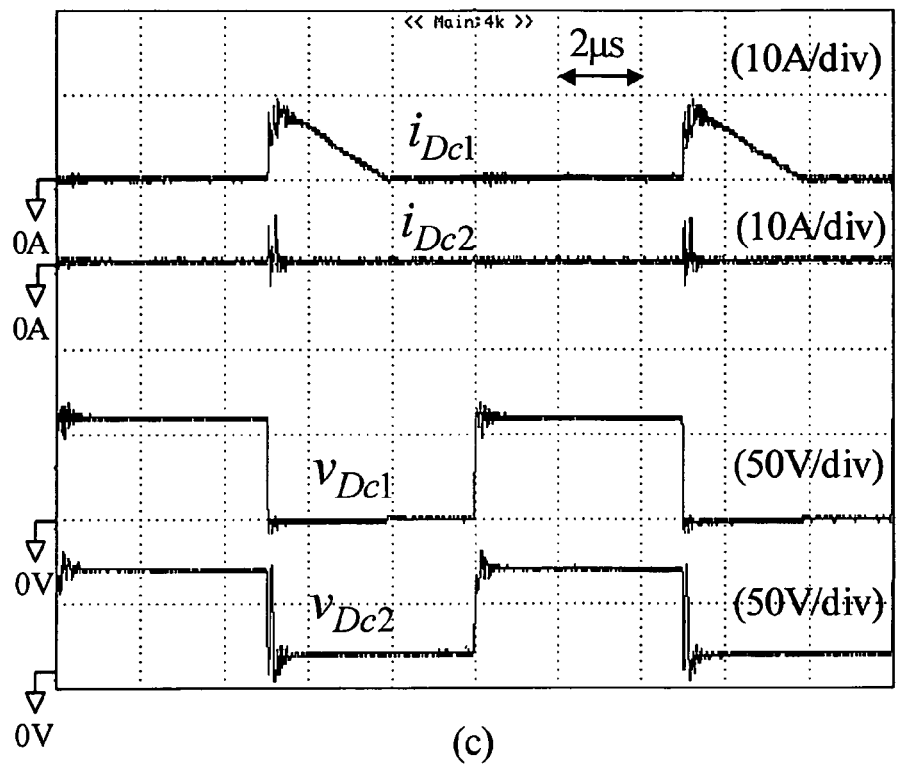
Figure 11:
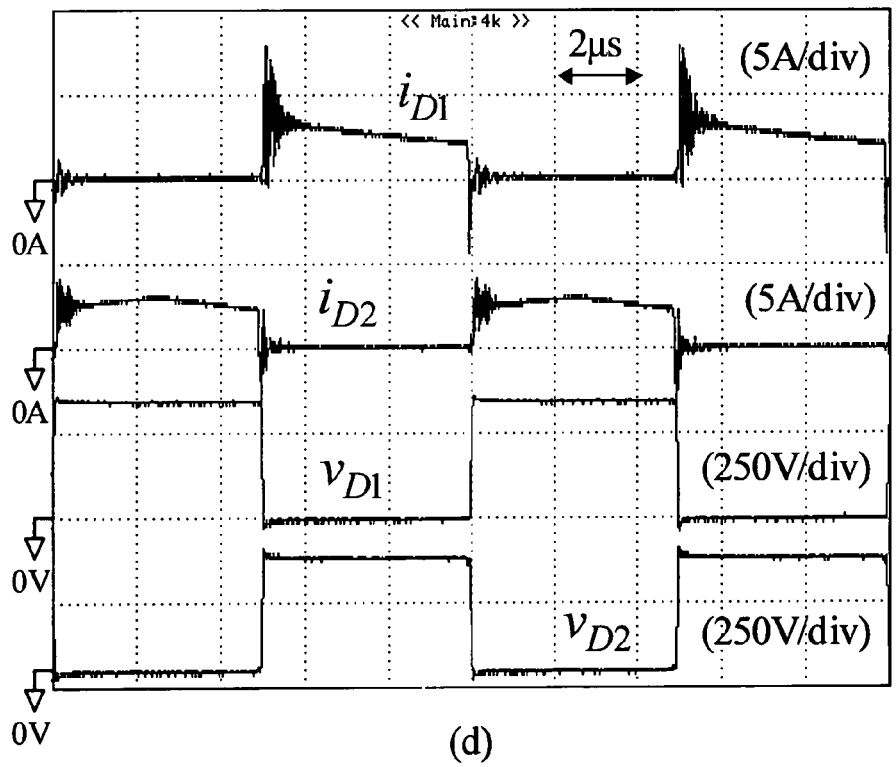

One example of embodiments of the high-efficiency single-stage multi-input bidirectional converter of the present invention is shown in FIG. 11; when output power of DC output circuit 107 is Po=513 W and output power of fuel cell battery is P1=250 W, waveforms of each components in discharging state are shown also. Observing FIG. 11($a$), clamping characters of first power semiconductor switch S1 and second power semiconductor switch S2 are prominent, and clamping voltages vS1 and vS2 are 60V and 50V, respectively. FIG. 11($b$) shows current waveforms of three windings; and because different coupling coefficients, current iL1 of first winding of coupled inductor has most excited induction current and its current slop is positive, while current iL2 of second winding of coupled inductor has relative large portion of induction current since current iL3 of third winding of coupled inductor is mainly supplied by current iL2 of second winding of coupled inductor. FIG. 11($c$) shows voltages and currents of first and second clamping diode Dc1 and Dc2; since the clamping voltage of first clamping diode Dc1 is low, further making cut off voltages of first and second clamping diode Dc1 and Dc2 low too, Schottky diodes with low power consumption and low conducting voltage can be chosen. FIG. 11($d$) shows voltages and currents of first and second high voltage diode D1 and D2, and their cut off voltages vD1 and vD2 are lower than DC output voltage Vo=400V; for high output voltage, it is easy to find diode with qualified voltage specification; since first and second high voltage diode D1 and D2 restrain each other, there is no voltage oscillation occurring and no need for snubber circuit; in addition, due to leakage induction of third winding L3 of coupled inductor limits change rate of the current, there are no high reversal recovery current in both first and second high voltage diode D1 and D2.

Figure 12:
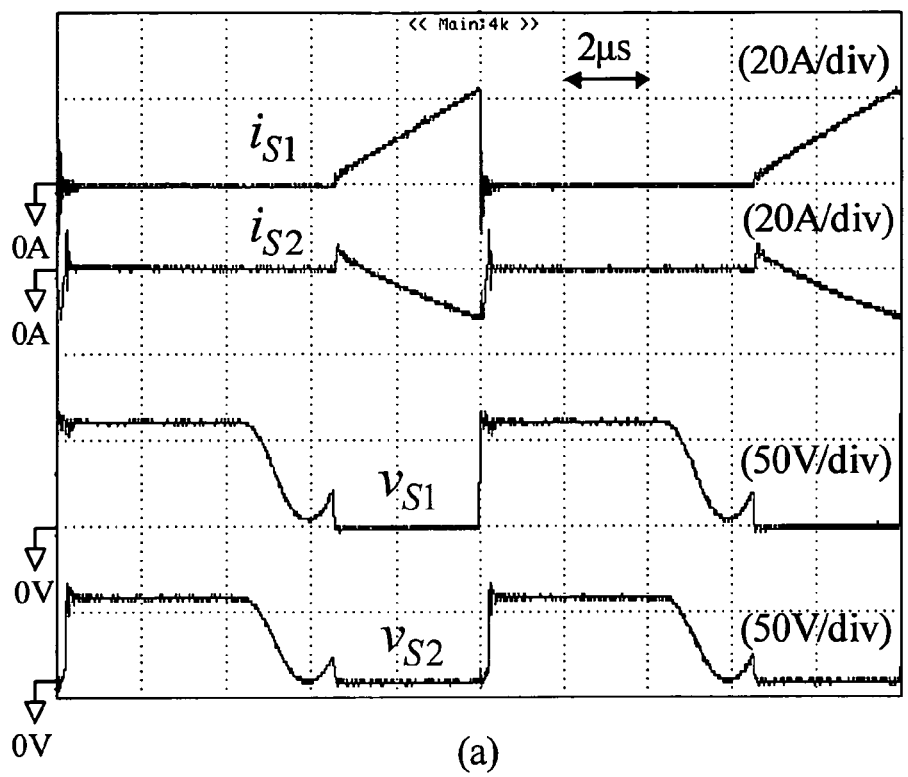
FIG. 12 is another one of preferred embodiments of the high efficiency single-stage multi-input bi-directional converter of the present invention. It shows waveforms of each component in charging state when output power of DC output circuit is 96 W and output power of fuel cell is 40 W.
Figure 12:
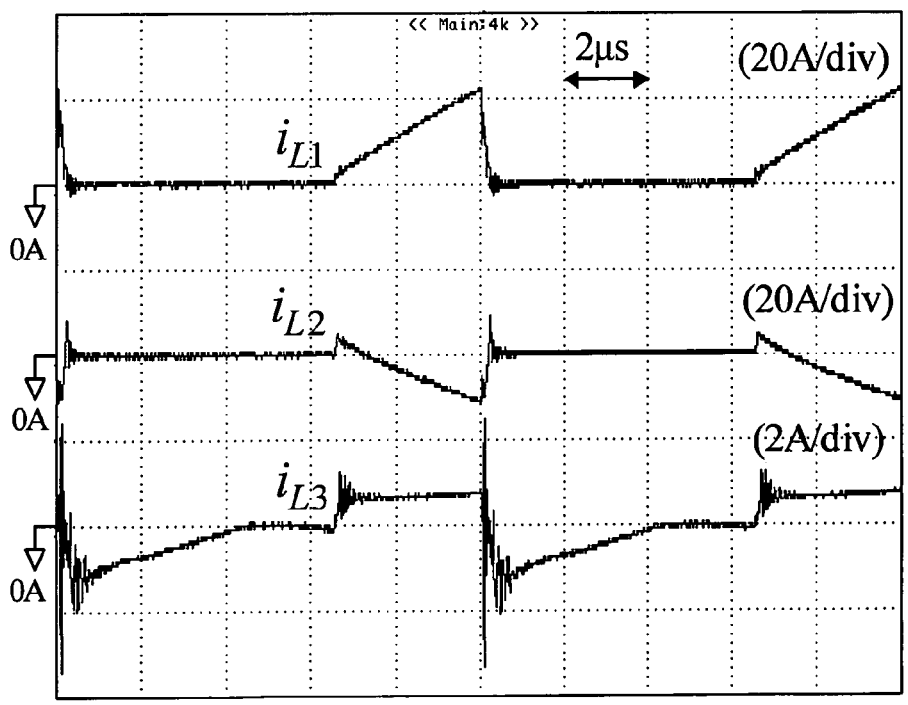
Figure 12:
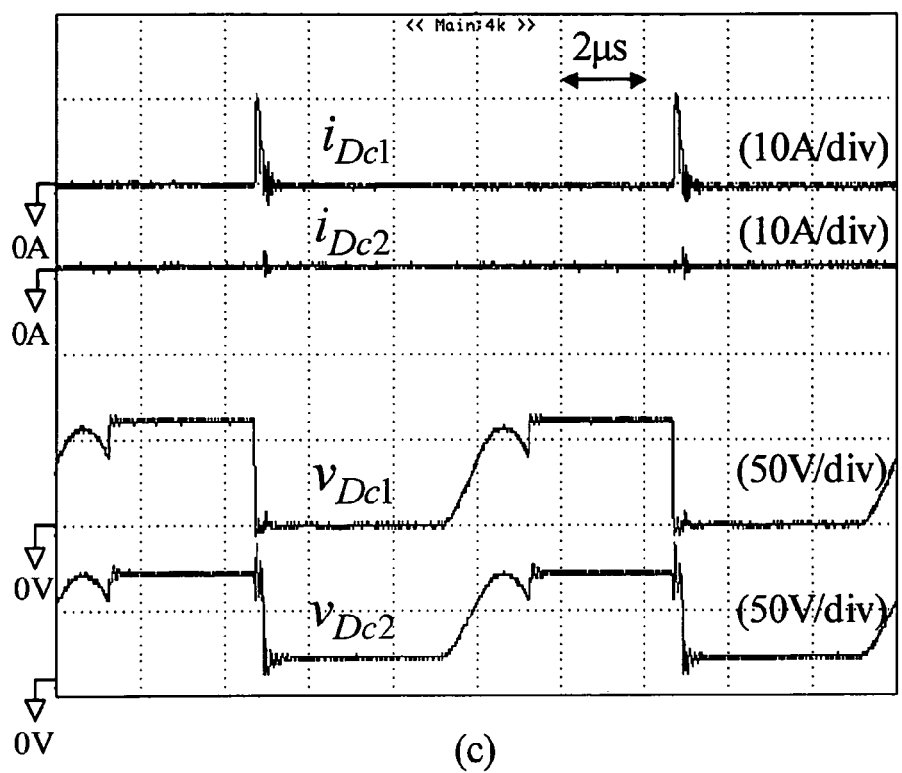
Figure 12:
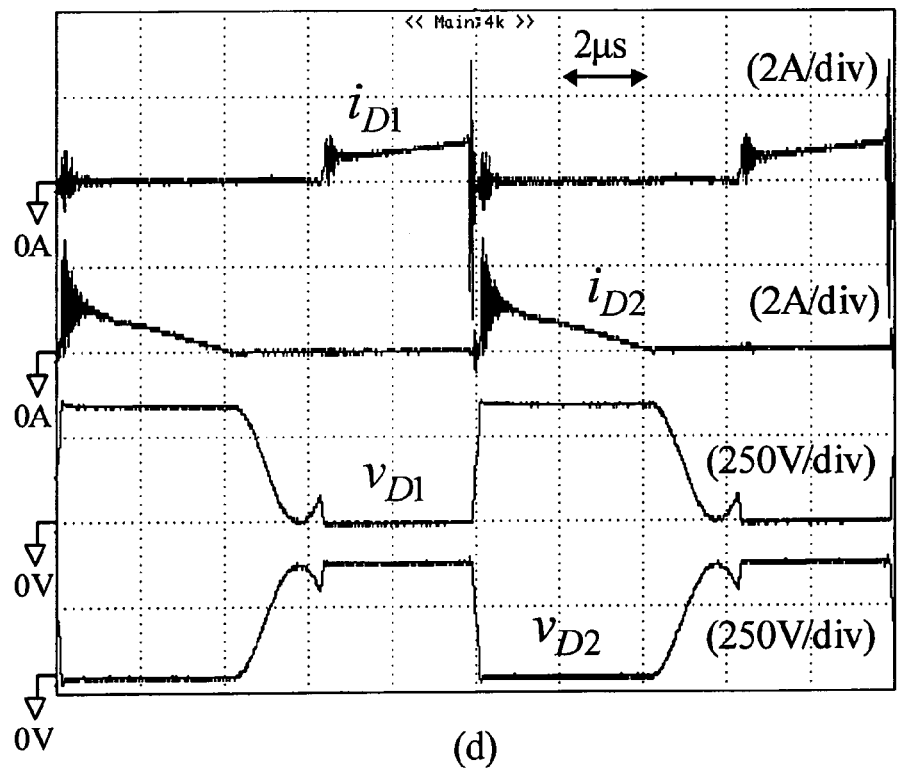

Another example of embodiments of the high-efficiency single-stage multi-input bi-directional conversion of the present invention is shown in FIG. 12; when output power of DC output circuit 107 is Po=96 W and charging power of rechargeable battery is P2c=40 W, waveforms of each components in charging state are shown also. From 12(a), we know that first and second power semiconductor switches S1 and S2 have good voltage clamping characters, and oscillation over both ends of switch is good for reducing switching loss; the oscillation is from, when excited induction current iLm1 of coupled inductor is zero, the leakage induction of the winding oscillates with parasite capacitor of switch. Furthermore, current iL2 of second winding of coupled inductor will flow out of the polar point and charge second DC input voltage source V2 (rechargeable battery); at this time, second power semiconductor switch S2 has a effect of synchronous rectification, and has smaller conducting loss comparing to using diode, beneficial in improving conversion efficiency. FIG. 12(b) is current waveforms of each winding; since the charging state operates in non-continuous current mode, excited induction current iLm1 of first winding of coupled inductor starts almost at zero and rising, adding the impact from current iL2 of second winding, current iL1 of first winding has relative large current harmonics; because power semiconductor switches with low conducting resistance are used, this harmonics has limited impact on conversion efficiency.

Figure 13:
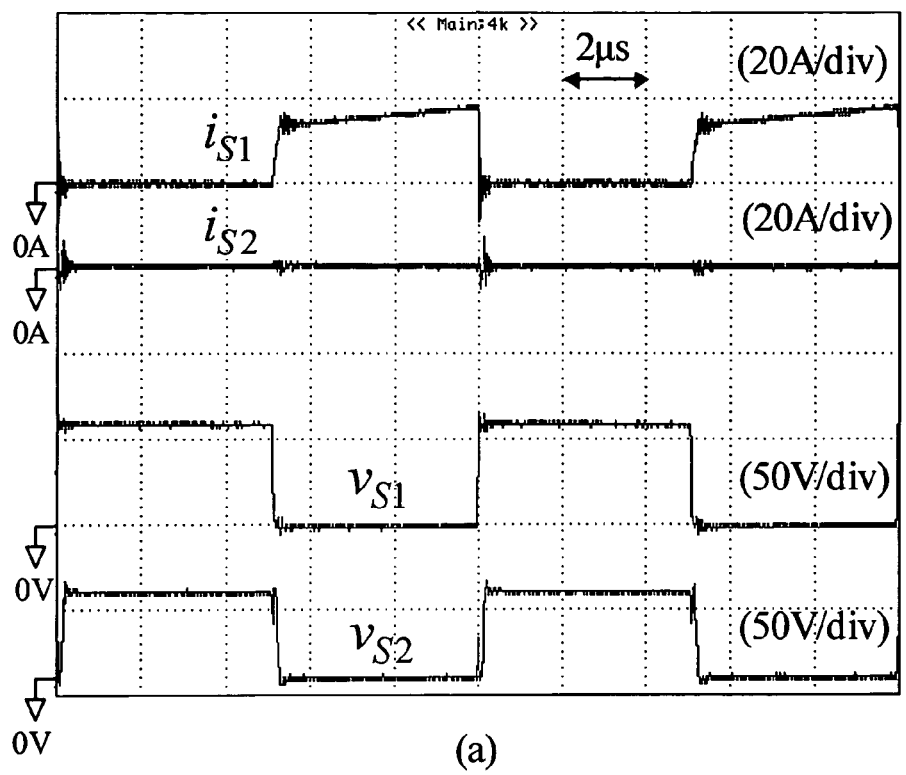
FIG. 13 is another one of preferred embodiments of the high efficiency single-stage multi-input bidirectional converter of the present invention. It shows waveforms of each component in standalone state when output power of DC output circuit is 235 W.
Figure 13:
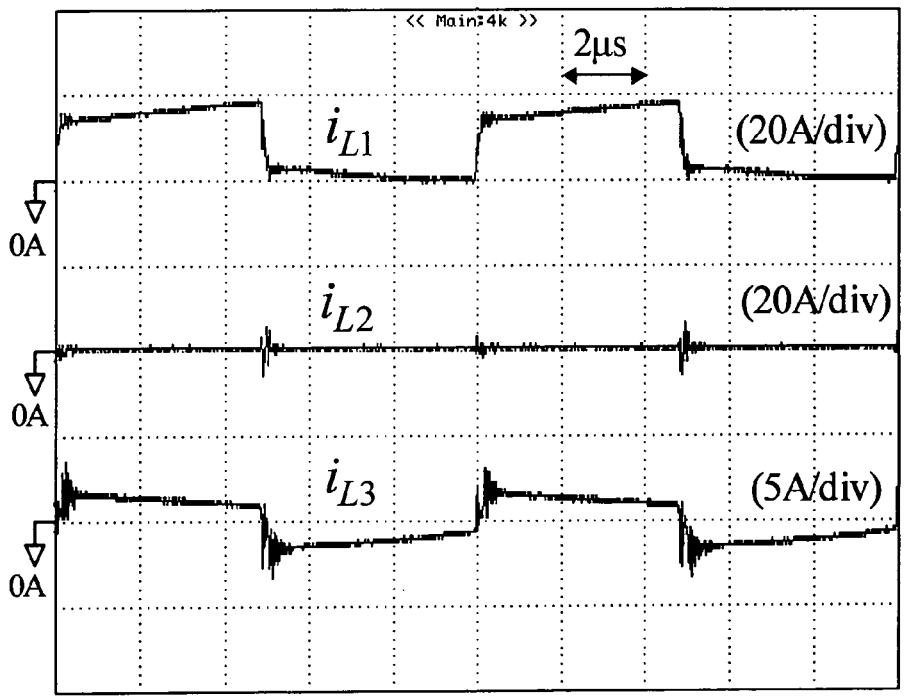
Figure 13:
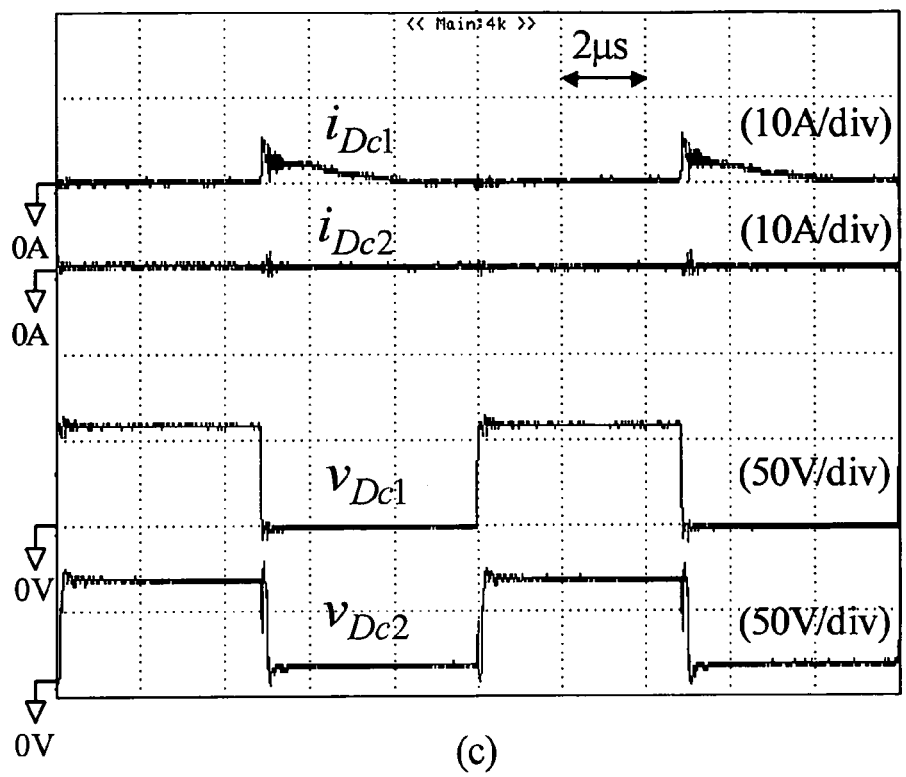
Figure 13:
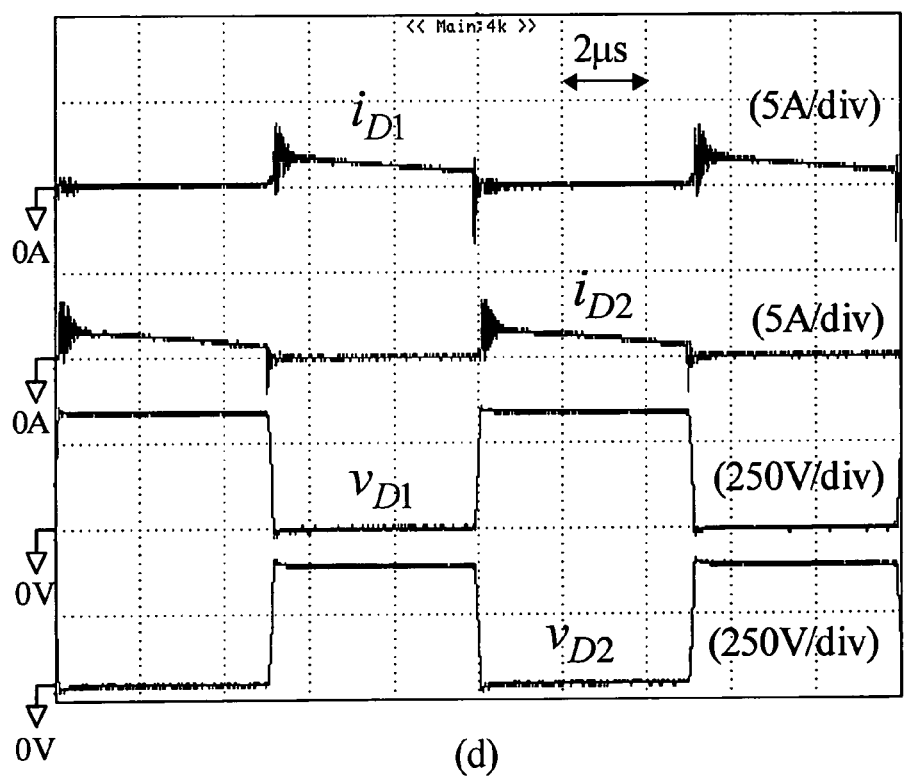

Another example of embodiments of the high-efficiency single-stage multi-input bi-directional converter of the present invention is shown in FIG. 13; when output power of DC output circuit 107 is Po=235 W, waveforms of each components in standalone state are shown also. From FIG. 13(a), we know that, during standalone state, second power semiconductor switch S2 is turned off; therefore, when first power semiconductor switch S1 is turned on, there is no current passing through second power semiconductor switch S2. FIG. 13(b) shows current waveforms of each winding; current iL1 of first winding of coupled inductor provides both excited induction current iLm1 of first winding and induction current iL3 of third winding; these two current has opposite slops, and combined to current iL1 of first winding of coupled inductor, which is near rectangular waveform, helpful in reducing switch's conducting loss.

Figure 14:
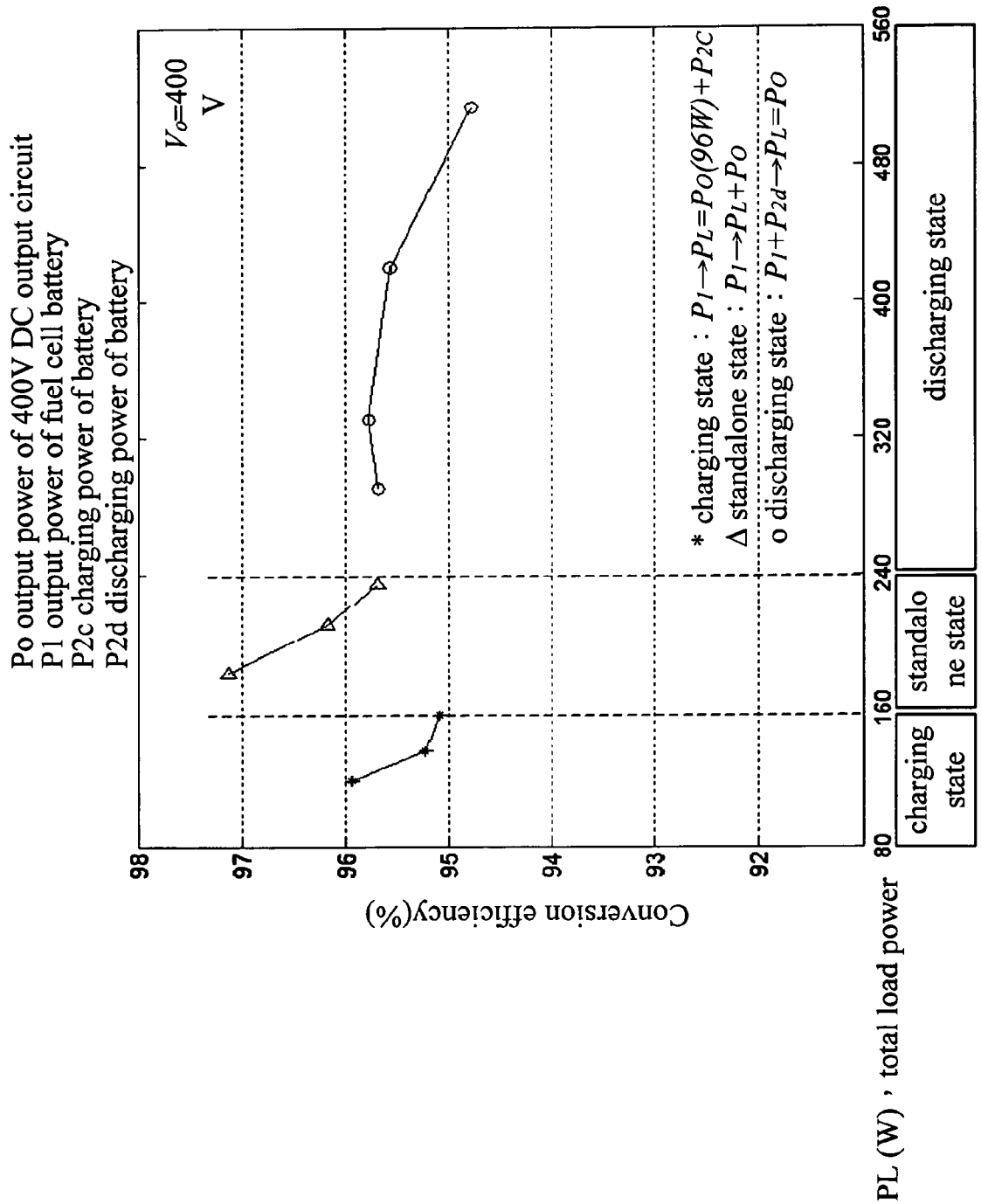
FIG. 14 is another one of preferred embodiments of the high efficiency single-stage multi-input bidirectional converter of the present invention. It shows conversion efficiency for charging, discharging and standalone state.

Conversion efficiencies of charging state, standalone state and discharging state of another example of embodiments of the high-efficiency single-stage multi-input bidirectional converter of the present invention is shown in FIG. 14; from FIG. 14, we know that conversion efficiency for each state is greater than 95%, and in standalone state, maximum efficiency is over 97%. Although charging state operates in non-continuous current mode, and has relative large current harmonics, the present invention in charging state still has fairly good conversion efficiency, due to switches with low conducting resistance are used, synchronous rectification and soft switching induced by oscillation. During standalone state, conversion efficiency is high due to near rectangular current waveform iS1 with low harmonics of first power semiconductor switch. During discharging state, even output power of DC output circuit 107 increases dramatically, due to fuel cell battery and rechargeable battery supply power together, and first and second power semiconductor switch S1 and S2 each bears current of their own voltage sources, i.e., current division, conversion efficiency is high and does not decrease quickly due to output power increase.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A high efficiency single-stage multi-input bi-directional converter, comprising:
    a first DC input circuit, including first DC input voltage source;
    a second DC input circuit, including second DC input voltage source, i.e. rechargeable battery;
    a first winding circuit, including first winding of a coupled inductor and a first power semiconductor switch; the first winding of the coupled inductor is connected in series to the first power semiconductor switch; through on/off of the first power semiconductor switch controls energy storing and releasing of the first winding of the coupled inductor;
    a second winding circuit, including second winding of the coupled inductor and a second power semiconductor switch; the second winding of the coupled inductor is connected in series to the second power semiconductor switch;
    a third winding circuit, including third winding of the coupled inductor, a balance capacitor, a first high voltage diode, a second high voltage diode, a first high voltage capacitor and a second high voltage capacitor; one end of the third winding of the coupled inductor connects to positive end of the first high voltage capacitor, negative end of the first high voltage capacitor connects to positive end of the second high voltage capacitor, negative end of the second high voltage capacitor connects to input end of the second high voltage diode, the output end of the second high voltage diode connects to back to input end of the first high voltage diode; at the same time, the other end of the third winding of the coupled inductor connects to one end of the balance capacitor, and the other end of the balance capacitor connects to negative end of the first high voltage capacitor;
    a clamping circuit: including a clamping capacitor, a first clamping diode and a second clamping diode; output end of the first clamping diode and output end of the second clamping diode both connect to positive end of the clamping capacitor;
    a DC output circuit, including load, i.e., DC high voltage bus bar;
    a charging/discharging control and drive circuit, including feedback voltage of the first DC input voltage source, voltage of the second DC input voltage source and the DC output voltage; the charging/discharging control and drive circuit generates driving signal with adjustable duty cycle, to turn on and off the first and second power semiconductor switches; depending on the conditions of the first and second power semiconductor switches, three states exist;
    designating the first DC input voltage source is first preferred supplier; the first is discharging state, in which first and second power semiconductor switches are turned on/off at the same time; the second is charging state, in which first and second power semiconductor switches are turned on/off at the same time;

the third is standalone state, in which only first power semiconductor switch is turned on/off.

2. The converter as claimed in claim 1, wherein the discharging state charging/discharging control and drive circuit utilizes the first DC input voltage source and the second DC input voltage source, through the high efficiency single-stage multi-input bi-directional converter, to supply high voltage demanded by the load; when the first power semiconductor switch of the first winding circuit and the second power semiconductor switch of the second winding circuit are turned on at the same time, excited inductions of the first and the second winding of the coupled inductor together establish its own winding voltage and store energy; at the moment, since polar point of the third winding of the coupled inductor has positive voltage, the first high voltage diode of the third winding circuit is turned on, charging the first high voltage capacitor and storing energy, while current of the third winding of the coupled inductor is supplied by inductions of the first and second winding; when the first power semiconductor switch of the first winding circuit and the second power semiconductor switch of the second winding circuit are turned off at the same time, and the first clamping diode and the second clamping diode of the clamping circuit are turned on, charging the clamping capacitor and absorbing energy released by the leakage induction for the first and second winding of coupled inductor, which reduces voltage spike occurrence at both ends of the switches; at the same time, according to flux conservation theory, energy stored in the first and second winding of the coupled inductor are converted to energy needed by the third winding of the coupled inductor to charge the second high voltage capacitor; after adding the voltages of the first high voltage capacitor, second high voltage capacitor and the clamping capacitor in series, stable DC output voltage is obtained.

3. The converter as claimed in claim 1, wherein the charging state of the charging/discharging and drive circuit utilizes the first DC input voltage source, through the high efficiency single-stage multi-input bi-directional converter, not only can greatly boost the DC input voltage and supply high voltage needed by the load, but also can use the first DC input voltage source to charge the second DC input voltage source; when the first power semiconductor switch of the first winding circuit is turned on, excited induction of the first winding of the coupled inductor establishes each winding's voltage and stores energy; at the moment, the polar point of the second winding of the coupled inductor has positive voltage, and the second power semiconductor switch of the second winding circuit is turned on, hence charging the second DC input voltage source, in which the second power semiconductor switch has an effect of synchronous rectification; in addition, the polar point of the third winding of the coupled inductor also has positive voltage, through the first high voltage diode of the third winding circuit, charging the first high voltage capacitor; at the moment, the currents of the second and third winding of the coupled inductor are supplied by the current of the first winding; when the first power semiconductor switch is turned off, and the first clamping diode of the clamping circuit is turned on, charging the clamping capacitor and absorbing energy released by the leakage induction of the first winding of coupled inductor, which avoids damaging circuit components by voltage spike; at the same time, after the current of the third winding of the coupled inductor changes direction, according to flux conservation theory, energy stored by excited induction of the first winding of the coupled inductor is converted to energy needed by the third winding of the coupled inductor to charge the second high voltage capacitor of the third winding circuit; after adding the voltages of the first high voltage capacitor, second high voltage capacitor and the clamping capacitor in series, stable DC output voltage is obtained.

4. The converter as claimed in claim 1, wherein the charging state of the charging/discharging and drive circuit utilizes the first DC input voltage source and on/off of the first power semiconductor switch of the first winding circuit, through the high efficiency single-stage multi-input bi-directional converter, greatly boost the DC input voltage and supply high voltage needed by the load, when the first power semiconductor of the first winding circuit is turned on, excited induction of the first winding of the coupled inductor establishes each winding's voltage and stores energy; the polar point of the third winding of the coupled inductor has positive voltage, and the first high voltage diode of the third winding circuit is turned on, charging the first high voltage capacitor, while the current of the third winding of the coupled inductor is supplied by the current of the first winding of the coupled inductor; when the first power semiconductor switch is turned off, and the first clamping diode of the clamping circuit is turned on, charging the clamping capacitor and absorbing energy released by the leakage induction of the first winding of the coupled inductor; at the same time, according to flux conservation theory, energy stored by excited induction of the first winding of the coupled inductor is converted to energy needed by the third winding of the coupled inductor to charge the second high voltage capacitor of the third winding circuit; after adding the voltages of the first high voltage capacitor, second high voltage capacitor and the clamping capacitor in series, stable DC output voltage is obtained.

5. The converter as claimed in claim 1, wherein the third winding of the coupled inductor of the third winding circuit, when the polar points of the first and second winding of the coupled inductor do not change, changes its polar point to other end and operates normally, charging the first and second high voltage capacitor of the third winding circuit; only the order of charging is different.

6. The converter as claimed in claim 4, wherein the standalone state of the charging/discharging and drive circuit assumes the first DC input voltage source as first preferred supplier; when the standalone state operates during the first power semiconductor switch is turned on/off and the second power semiconductor switch is turned off, if the first DC input voltage source needs check up for maintenance, the standalone state can also operates during the second power semiconductor switch is turned on/off, while the first power semiconductor switch is turned off and the second DC input voltage source supplies power to the load.

* * * * *